(12) United States Patent
Pan

(10) Patent No.: US 7,471,440 B2
(45) Date of Patent: Dec. 30, 2008

(54) FABRICATING MICRO DEVICES USING SACRIFICIAL MATERIALS

(75) Inventor: Shaoher X. Pan, San Jose, CA (US)

(73) Assignee: Spatial Photonics, Inc., Sunnyvale, CA (US)

( * ) Notice: Subject to any disclaimer, the term of this patent is extended or adjusted under 35 U.S.C. 154(b) by 114 days.

(21) Appl. No.: 11/407,014

(22) Filed: Apr. 18, 2006

(65) Prior Publication Data

US 2006/0187523 A1 Aug. 24, 2006

Related U.S. Application Data

(63) Continuation-in-part of application No. 10/974,468, filed on Oct. 26, 2004, now Pat. No. 7,167,298.

(60) Provisional application No. 60/514,589, filed on Oct. 27, 2003.

(51) Int. Cl.
G02B 26/00 (2006.01)
H01L 21/00 (2006.01)

(52) U.S. Cl. .......................... 359/290; 438/29

(58) Field of Classification Search .............. 359/290, 359/291, 292, 293, 295, 298, 223, 224, 871; 438/65, 66, 72, 73, 104, 107, 21, 29, 479, 438/702; 257/443, E21.002; 348/771; 216/2, 216/24, 27, 36, 38

See application file for complete search history.

(56) References Cited

U.S. PATENT DOCUMENTS

| | | | |
|---|---|---|---|
| 5,061,049 A | 10/1991 | Hornbeck | |
| 5,142,405 A | 8/1992 | Hornbeck | |
| 5,172,262 A | 12/1992 | Hornbeck | |
| 5,331,454 A | 7/1994 | Hornbeck | |
| 5,382,961 A | 1/1995 | Gale, Jr. | |
| 5,454,906 A * | 10/1995 | Baker et al. | 216/66 |
| 5,650,881 A | 7/1997 | Hornbeck | |
| 5,665,997 A | 9/1997 | Weaver et al. | |
| 6,287,979 B1 * | 9/2001 | Zhou et al. | 438/723 |
| 6,356,378 B1 | 3/2002 | Huibers | |
| 6,800,503 B2 * | 10/2004 | Kocis et al. | 438/52 |
| 6,862,127 B1 * | 3/2005 | Ishii | 359/291 |
| 6,870,654 B2 * | 3/2005 | Lin et al. | 359/245 |

(Continued)

OTHER PUBLICATIONS

Shaoher X. Pan, "High Contrast Spatial Light Modulator", U.S. Appl. No. 10/974,461, filed Oct. 25, 2004, 31 pp.

(Continued)

*Primary Examiner*—Hung X Dang
*Assistant Examiner*—Tuyen Q Tra
(74) *Attorney, Agent, or Firm*—Fish & Richardson P.C.

(57) ABSTRACT

A method of fabricating a tiltable micro mirror plate includes forming a substrate comprising an upper surface and a hinge support post in connection with the upper surface, disposing over the substrate a first sacrificial material selected from the group of amorphous carbon, polyarylene, polyarylene ether, and hydrogen silsesquioxane, depositing one or more layers of structural materials over the first sacrificial material, forming an opening in the one or more layers of structural materials, wherein the opening can provide access from outside to the first sacrificial material below the one or more layers of structural materials, and removing the first sacrificial material to form the tiltable micro mirror plate in connection with the hinge support post.

11 Claims, 14 Drawing Sheets

U.S. PATENT DOCUMENTS

| | | | |
|---|---|---|---|
| 6,960,971 B2 * | 11/2005 | Park et al. | 333/262 |
| 6,992,810 B2 | 1/2006 | Pan et al. | |
| 7,261,825 B2 * | 8/2007 | Metzger et al. | 216/2 |
| 2002/0140533 A1 * | 10/2002 | Miyazaki et al. | 335/78 |
| 2005/0128564 A1 | 6/2005 | Pan | |

OTHER PUBLICATIONS

Larry J. Hornbeck, "Digital Light Processing™ for High-Brightness, High-Resolution Applications", Feb. 10-12, 1997, San Jose, CA, pp. 1-14.

* cited by examiner

FABRICATING MICRO DEVICES USING SACRIFICIAL MATERIALS

CROSS-REFERENCE TO RELATED APPLICATIONS

This application is a continuation-in-part and claims the benefit of priority under 35 U.S.C. Section 120 of U.S. application Ser. No. 10/974,468, filed Oct. 26, 2004, now U.S. Pat. No. 7,167,298 which claims the benefit of priority of U.S. Provisional Application Ser. No. 60/514,589, filed Oct. 27, 2003. The disclosure of each prior application is considered part of and is incorporated by reference in the disclosure of this application.

BACKGROUND

The present disclosure relates to the fabrication of micro structures and micro devices.

Sacrificial material is commonly used to fabricate micro devices. Planar micro fabrication technologies usually build micro structures in layers over a substrate, such as in a bottom up manner. The lower layers are deposited and processed, followed by the upper layers. Sacrificial material can be used when a micro structure includes an air gap between an upper structure portion and a lower structure portion. The sacrificial material is disposed over the lower structure portion. The upper structure portion is subsequently formed over the sacrificial material and the lower structure portion. The sacrificial material is finally removed to form the air gap between the upper structure portion and the lower structure portion. Photoresist is a commonly used sacrificial material.

There are several drawbacks to using photoresist as a sacrificial material. Photoresist is not stable above 150° C., which prevents the use of any processing steps at temperatures over 150° C. after applying the photoresist sacrificial material. The hardened photoresist has limited mechanical strength; it often cannot provide enough mechanical support for the upper structure portion, particularly if the upper structure portion is thin. Without proper mechanical support from the hardened photoresist, a thin upper structure portion may not be able to sustain mechanical stresses during processing, such as chemical mechanical polishing (CMP). Furthermore, photoresist usually has impurities such as oxygen or nitrogen, which may cause contamination in certain device applications.

SUMMARY

In one general aspect, the present invention relates to a method of fabricating a tiltable micro mirror plate. The method includes forming a substrate comprising an upper surface and a hinge support post in connection with the upper surface, disposing over the substrate a first sacrificial material selected from the group of amorphous carbon, polyarylene, polyarylene ether, and hydrogen silsesquioxane, depositing one or more layers of structural materials over the first sacrificial material, forming an opening in the one or more layers of structural materials, wherein the opening can provide access from outside to the first sacrificial material below the one or more layers of structural materials, and removing the first sacrificial material to form the tiltable micro mirror plate in connection with the hinge support post.

In another general aspect, the present invention relates to a method of fabricating a micro structure. The method includes forming a substrate comprising a first structure portion having a first height and a second structure portion having a second height higher than the first height, disposing over the substrate a first sacrificial material selected from the group of amorphous carbon, polyarylene, polyarylene ether, and hydrogen silsesquioxane, wherein the sacrificial material covers at least the first structure portion, depositing a layer of a first structural material over the first sacrificial material, forming an opening in the layer of the first structural material, wherein the opening can provide access from outside to the first sacrificial material below the layer of the first structural material, and removing the first sacrificial material to form a third structure portion in connection with the second structure portion, wherein at least part of the third structure portion is above the first structure portion.

Implementations of the system may include one or more of the following. Disposing the first sacrificial material over the substrate can include depositing amorphous carbon over the substrate by CVD or PECVD. Disposing the first sacrificial material over the substrate can include spin-coating at least one of polyarylene, polyarylene ether, or hydrogen silsesquioxane over the substrate. The method can further include removing the first sacrificial material by plasma etching through the opening in the one or more layers of structural materials. The method can further include planarizing the first sacrificial material prior to depositing the one or more layers of structural materials over the first sacrificial material. The method can further include planarizing the first sacrificial material to the same height as the top surface of the hinge support post and depositing the one or more layers of structural materials over the top surface of the hinge support post. Planarizing the first sacrificial material can include chemical mechanical polishing. The method can further include forming a mask over the one or more layers of structural materials and selectively removing the one or more layers of structural materials not covered by the mask to form the opening in the one or more layers of structural materials.

The substrate further can include a landing tip in connection with the upper surface, and wherein the landing tip is configured to stop the tilt movement of the tiltable micro mirror plate by coming to contact with the lower surface of the tiltable micro mirror plate. The substrate can include an electronic circuit configured to control the tilt movement of the tiltable micro mirror plate. Depositing the one or more layers of structural materials over the first sacrificial material can include depositing a conductive material to form a lower layer for the tiltable micro mirror plate; depositing a structural material over the lower layer to form a middle layer for the tiltable micro mirror plate; and depositing a reflective material over the middle layer to form a upper layer for the tiltable micro mirror plate. The method can further include forming a cavity in the lower layer for the tiltable micro mirror plate; and filling the cavity with a second sacrificial material selected from the group of amorphous carbon, polyarylene, polyarylene ether, and hydrogen silsesquioxane prior to depositing the structural material to form the middle layer for the tiltable micro mirror plate. The method can further include removing the first sacrificial material the second sacrificial material to form the tiltable micro mirror plate having an opening in the lower surface of the lower layer and a hinge component in connection with the hinge support post, wherein the hinge component extends into the cavity in the lower layer, and wherein the titlable mirror plate is configured to tilt about a pivot point defined by the hinge component. The substrate can include an electrode over the upper surface of the substrate, and wherein the tiltable micro mirror plate is actuatable to tilt when an electric voltage is applied between the conductive material in the lower layer of the mirror plate and the electrode over the upper surface of the substrate. The structural material can include a material selected from the group of titanium, tantalum, tungsten, molybdenum, an alloy, aluminum, aluminum-silicon alloys, silicon, amorphous silicon, polysilicon, and silicide.

Implementations may include one or more of the following advantages. The present specification discloses sacrificial materials and methods that can overcome the drawbacks of some convention sacrificial materials. The disclosed sacrificial materials provide excellent thermal stability and low coefficient of thermal expansion. They can maintain mechanical strength at temperatures up to 500° C., which is higher than the temperature range within which a photoresist could be used. The higher-operation temperature allows high-temperature processing to be performed after the introduction and hardening of the disclosed sacrificial materials.

The disclosed sacrificial materials can be removed by isotropic etching in dry processes, which is simpler than the wet processes for cleaning the conventional sacrificial materials. Isotropic etching also allows convenient removal of the disclosed sacrificial materials that are positioned under an upper an upper structural layer such as a mirror plate, which cannot easily be accomplished by dry anisotropic etching processes.

The disclosed amorphous carbon can be deposited and removed as a sacrificial material by standard semiconductor processes. Amorphous carbon can be deposited by chemical vapor deposition (CVD) or plasma enhanced chemical vapor deposition (PECVD). Amorphous carbon can be removed by a dry process, such as isotropic plasma etching, microwave, or activated gas vapor. The removal is highly selective relative to common semiconductor components, such as silicon and silicon dioxide.

After hardening, the disclosed sacrificial materials also provide improved mechanical strengths compared to photo resist, which allows a structure formed over the sacrificial material to endure higher mechanical stresses in process steps such as CMP. The disclosed sacrificial materials also possess improved mechanical wear resistance.

Although the invention has been particularly shown and described with reference to multiple embodiments, it will be understood by persons skilled in the relevant art that various changes in form and details can be made therein without departing from the spirit and scope of the invention.

DETAILED DESCRIPTION

In one example, the disclosed materials and methods are illustrated by the fabrication of spatial light modulator (SLM) based on a micro mirror array. A micro mirror array typically includes an array of cells, each of which includes a micro mirror plate that can be tilted about an axis and, furthermore, circuitry for generating electrostatic forces that tilt the micro mirror plate. In a digital mode of operation, the micro mirror plate can be tilted to stay at two positions. In an "on" position, the micro mirror plate directs incident light to form an assigned pixel in a display image. In an "off" position, the micro mirror plate directs incident light away from the display image.

A cell can include structures for mechanically stopping the micro mirror plate at the "on" position and the "off" position. These structures are referred to in the present specification as mechanical stops. The SLM operates by tilting a selected combination of micro mirrors to project light to form appropriate image pixels in a display image. A display device based on an SLM is usually required to refresh image frames at high frequencies typical of video applications. Each instance of image frame refreshing can involve the tilting of all or some of the micro mirrors to new respective orientations. Providing fast mirror tilt movement is therefore crucial to any functional SLM-based display device.

Figure 1A:
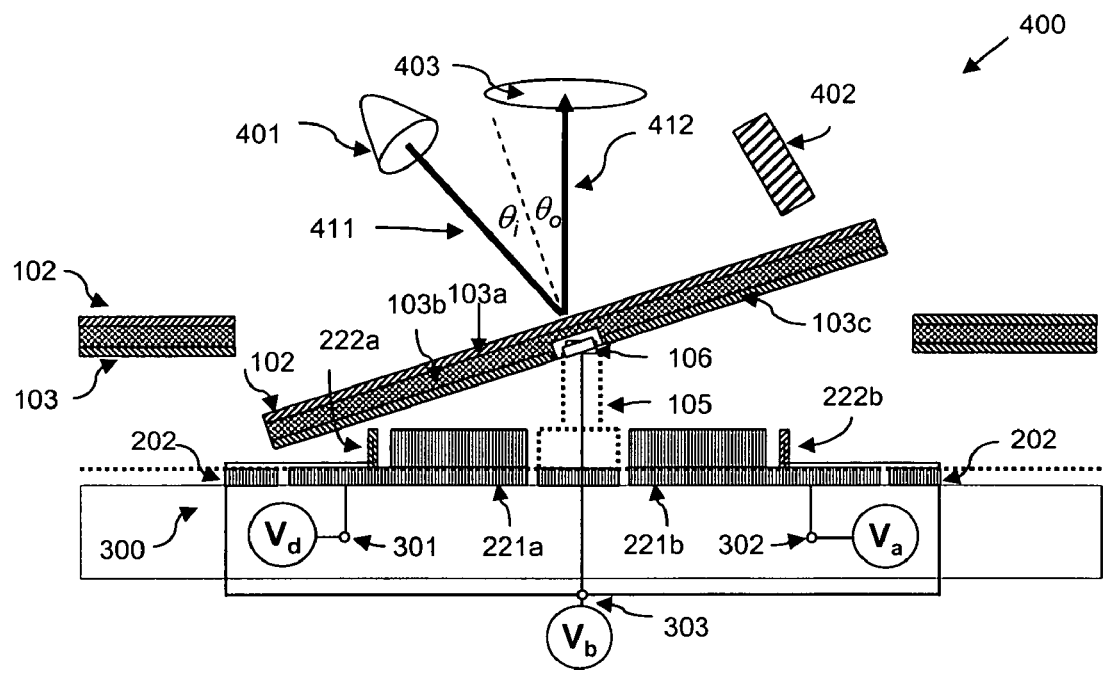
FIG. 1a illustrates a cross-section view of a micro mirror fabricated by the disclosed sacrificial material when the mirror plate is at an "on" state.
Figure 1B:
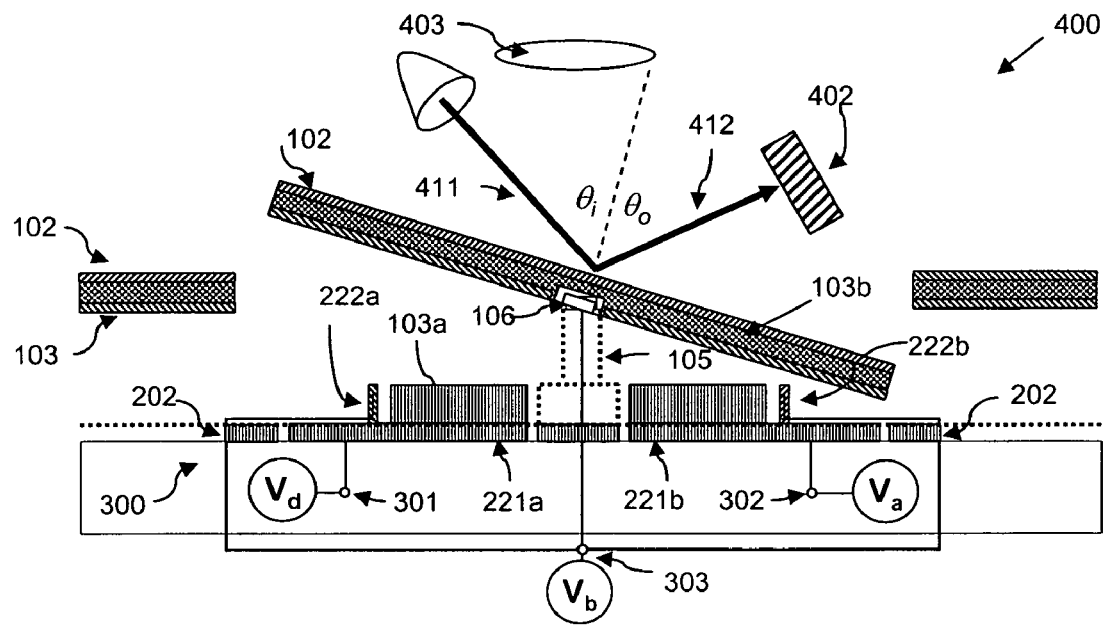
FIG. 1b illustrates a cross-section view of a micro mirror fabricated by the disclosed sacrificial material when the mirror plate is at an "off" state.

FIG. 1a shows a cross-section view of a portion of a spatial light modulator 400 wherein a micro mirror plate is in an "on" position. Incident light 411 from a source of illumination 401 is directed at an angle of incidence θi and is reflected at an angle of θo as reflected light 412 toward a display surface through a projection pupil 403. FIG. 1b shows a cross-sectional view of the same part of the spatial light modulator while the mirror plate is rotated toward another electrode under the other side of the hinge 106. The same incidental light 411 is reflected to form reflected light 412 at much larger angles θi and θo than in FIG. 1a. The angle of deflection of the deflected light 412 is predetermined by the dimensions of mirror plate 102 and the air gap spacing between its lower surfaces of the mirror plate 102 to the springy landing tips 222a and 222b. The deflected light 412 exits toward a light absorber 402.

Referring to FIGS. 1a and 1b, the SLM 400 includes three major portions: the bottom portion of control circuitry, the middle portion of a plurality of step electrodes, landing tips, hinge support posts, and the upper portion covered with a plurality of mirror plates with hidden torsion hinges and cavities.

The bottom portion includes a control substrate 300 with addressing circuitries to selectively control the operation of the mirror plates in the SLM 400. The addressing circuitries include an array of memory cells and word-line/bit-line interconnect for communication signals. The electrical addressing circuitry on a silicon wafer substrate can be fabricated using standard CMOS technology, and resembles a low-density memory array.

The middle portion of the high contrast SLM 400 includes step electrodes 221a and 221b, landing tips 222a and 222b, hinge support posts 105, and a hinge support frame 202. The multi-level step electrodes 221a and 221b are designed to improve the capacitive coupling efficiency of electrostatic torques during the angular cross over transition. By raising the surfaces of the step electrodes 221a and 221b near the hinge 106 area, the air gap spacing between the mirror plate 102 and the electrodes 221a and 221b is effectively narrowed. Since the electrostatic attractive force is inversely proportional to the square of the distance between the mirror plates and electrodes, this effect becomes apparent when the mirror plate is tilted at its landing positions. When operating in analog mode, highly efficient electrostatic coupling allows a more precise and stable control of the tilting angles of the individual micro mirror plate in the spatial light modulator. In a digital mode, the SLM requires much lower driving voltage potential in addressing circuitry to operate. The height differences between the first level and the second levels of the step electrodes 221a and 221b may vary from 0.2 microns to 3 microns depending on the relative height of air gap between the first level electrodes to the mirror plate.

On the top surface of control substrate, a pair of stationary landing tips 222a and 222b is designed to have a same height as that of second level of the step electrodes 221a and 221b for manufacturing simplicity. The landing tips 222a and 222b can provide a gentle mechanical touch-down for the mirror plate to land on each angular cross over transition at a pre-determined angle precisely. Adding a stationary landing tip 222a and 222b on the surface of control substrate enhances the robotics of operation and prolongs the reliability of the devices. Furthermore, the landing tips 222a and 222b allow an ease of separation between the mirror plate 102 and its landing tip 222a and 222b, which effectively eliminates the contact surface adhesion during a digital operation of the SLM 400. For example, to initiate an angular cross over transition, a sharp bipolar pulse voltage Vb is applied to the bias electrode 303, which is typically connected to each mirror plate 102 through its hinges 106 and the hinge support posts 105. The voltage potential established by the bipolar bias Vb enhances the electrostatic forces on both side of the hinge 106. This strengthening is unequal on two sides at the landing position, due to the large difference in air gap spacing. Though the increases of bias voltages Vb on the lower surface 103c of mirror plate 102 has less impact on which direction the mirror plate 102 will rotate toward, a sharp increase of electrostatic forces F on the whole mirror plate 102 provides a dynamic excitation by converting the electromechanical kinetic energy into an elastic strain energy stored in the deformed hinges 106 and deformed landing tips 222a or 222b. After a bipolar pulse is released on the common bias Vb, the elastic strain energy of deformed landing tip 222a or 222b and the deformed hinges 106 is converted back to the kinetic energy of mirror plate as it springs and bounces away from the landing tip 222a or 222b. This perturbation of mirror plate toward the quiescent state enables a much smaller address voltage potential Va for angular cross over transition of mirror plate 102 from one state to the other.

The hinge support frame 202 on the surface of control substrate 300 is designed to strengthen the mechanical stability of the pairs of hinge support posts 105, and retain the electrostatic potentials locally. For simplicity, the height of hinge support frames 202 is designed to be the same height as the first level of the step electrodes 221a and 221b. With a fixed size of mirror plate 102, the height of a pair of hinge support posts 105 will determine the maximum deflection angles $\theta$ of a micro mirror array.

The upper portion of the SLM 400 includes an array of micro mirrors with a flat optically reflective layer 103a on the upper surfaces and a pair of hinges 106 under the cavities in the lower portion of mirror plate 102. A pair of hinges 106 in the mirror plate 102 are fabricated to be part of the mirror plate 102 and is kept a minimum distance under the reflective surface to allow only a gap for a pre-determined angular rotation. By minimizing the distances between the rotation axis defined by the pair of hinges 106 to the upper reflective surfaces 103a, the spatial light modulator effectively eliminates the horizontal displacement of each mirror plate during an angular transition. In some implementations, the gaps between adjacent mirror plates in the array of SLM is reduced to less than 0.2 microns to achieve a high active reflection area fill-ratio.

The structural materials used for micro deflection devices are preferably conductive, stable, with suitable hardness, elasticity, and stress. Ideally a single material can provide both the stiffness of mirror plate 102 and the plasticity of hinges 106 having sufficient strength to deflect without fracturing. In the present specification, such structural material is called electromechanical material. Furthermore, all the materials used in constructing the micro mirror array may be processed at temperatures up to 500° C., a typical process temperature range without damaging the pre-fabricated circuitries in the control substrate.

In the implementation shown in FIGS. 1a and 1b, the mirror plate 102 includes three layers. A reflective top layer 103a is made of aluminum and is typically about 600 angstrom thick. A middle layer 103b can be made of a silicon based material, for example, amorphous silicon, typically about 2000 to 5000 angstrom in thickness. A bottom layer 103c is made of titanium and is typically about 600 angstrom thick. As can be seen from FIGS. 1a and 1b, the hinge 106 can be implemented as part of the bottom layer 103c. The mirror plate 102 can be fabricated as described below.

According to an alternative embodiment, the materials of mirror plates 102, hinges 106, and the hinge support posts 105 can include aluminum, silicon, polysilicon, amorphous silicon, and aluminum-silicon alloys. The deposition can be accomplished by physical vapor deposition (PVD) magnetron sputtering a single target containing either or both aluminum and silicon in a controlled chamber with temperature below 500° C. Same structure layers may also be formed by PECVD.

According to another alternative embodiment, the materials of mirror plates 102, hinges 106, and the hinge support posts 105 can be made of materials such as silicon, polysilicon, amorphous silicon, aluminum, titanium, tantalum, tungsten, molybdenum, and silicides or alloys of aluminum, titanium, tantalum, tungsten, molybdenum. Refractory metals and their silicides are compatible with CMOS semiconductor processing and have relatively good mechanical properties.

These materials can be deposited by PVD, by CVD, and by PECVD. The optical reflectivity may be enhanced by further depositing a layer of metallic thin-films, such as aluminum, gold, or their alloys depending on the applications on the surfaces of mirror plate 102.

Figure 2:
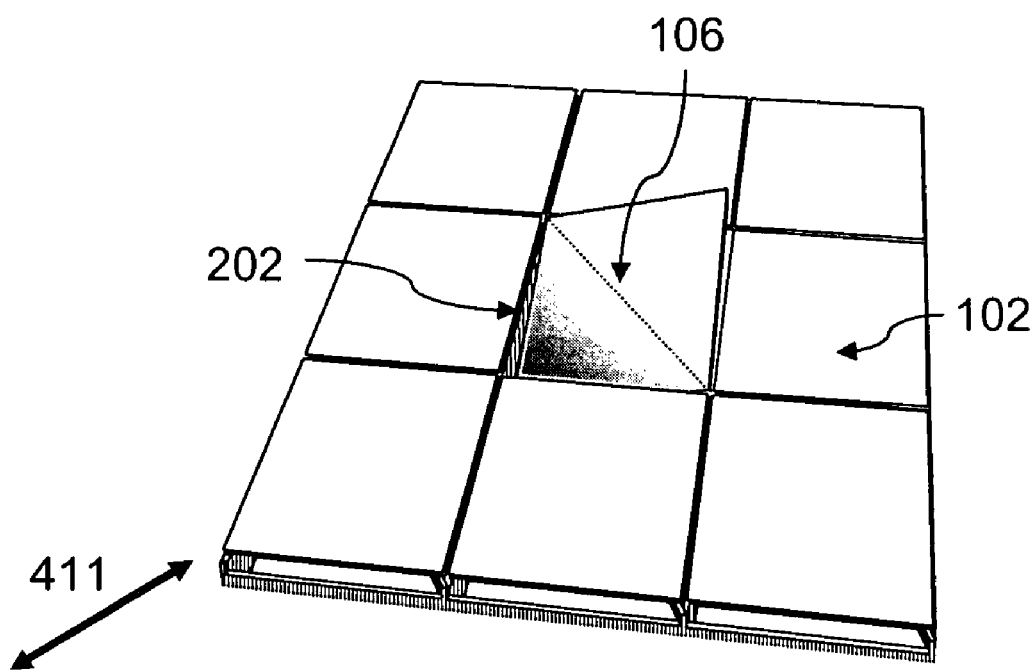
FIG. 2 is a perspective view of an array of rectangular shaped mirror plates.

To achieve a high contrast ratio of the deflected video images, any scattered light from a micro mirror array should be reduced or eliminated. Most common interferences come from the diffraction patterns generated by the scattering of illumination from the leading and trailing edges of individual mirror plates. The solution to the diffraction problem is to reduce the intensity of diffraction pattern and to direct the scattered light from the inactive area of each pixel to different directions away from the projection pupil. One method is directing the incident light 411 45° to the edges of the square-shaped mirror plate 102, which is sometimes called diagonal hinge or diagonal illumination configuration. FIG. 2 shows a perspective view showing the top of a part of the mirror array with each mirror plate 102 having a square shape using a diagonal illumination system. The hinges 106 of the mirror plate in the array are fabricated in diagonal direction along two opposite corners of the mirror plate and in perpendicular to the incident light 411. The advantage of a square shape mirror plate with a diagonal hinge axis is its ability to deflect the scattered light from the leading and trailing edges 45° away from the projection pupil 403. The disadvantage is that it requires the projection prism assembly system to be tilted to the edge of the SLM. The diagonal illumination has a low optical coupling efficiency when a conventional rectangular TIR prism system is used to separate the light beams that are reflected by the mirror plate 102 that is respectively at the "on" state and the "off" state. The twisted focusing spot requires an illumination larger than the size of rectangular micro mirror array surfaces in order to cover all active pixel arrays. A larger rectangular TIR prism increases the cost, size, and the weight of the projection display.

Figure 3:
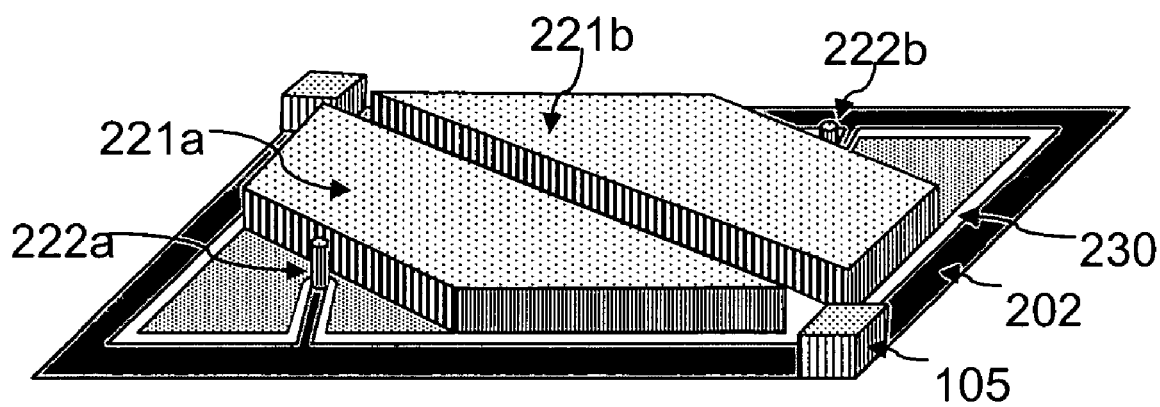
FIG. 3 is a perspective view showing the top of a part of the control circuitry substrate for a mirror plate of FIG. 2.

FIG. 3 shows perspective view of the top of a part of the control circuitry substrate for the projection system with diagonal illumination configuration. The pair of step electrodes 221a and 221b is arranged diagonal accordingly to improve the electrostatic efficiency of the capacitive coupling to the mirror plate 102. The two landing tips 211a and 211b act as the landing stops for a mechanical landing of mirror plates 102 to ensure the precision of tilted angle θ and to overcome the contact stiction. Made of high spring constant materials, these landing tips 222a and 222b act as landing springs to reduce the contact area when mirror plates are snap down. A second function of these landing tips 222 at the edge of two-level step electrodes 221a and 221b is their spring effect to separate itself from the mirror plates 102. When a sharp bipolar pulse voltage potential Vb is applied on the mirror plate 102 through a common bias electrode 303 of mirror array, a sharp increase of electrostatic forces F on the whole mirror plate 102 provides a dynamic excitation by converting the electromechanical kinetic energy into an elastic strain energy stored in the deformed hinges 106. The elastic strain energy is converted back to the kinetic energy of mirror plate 102 as it springs and bounces away from the landing tip 222a or 222b.

The straight edges or corners of the mirror plates in a periodic array can create a diffraction patterns tended to reduce the contrast of projected images by scattering the incident light 411 at a fixed angle. Curved leading and trailing edges of the mirror plate in the array can reduce the diffractions due to the variation of scattering angles of the incident light 411 on the edges of mirror plate. According to another embodiment, the reduction of the diffraction intensity into the projection pupil 403 while still maintaining an orthogonal illumination optics system is achieved by replacing the straight or fixed angular corner shape edges of a rectangular shape mirror plate with at least one or a series curvature shape leading and trailing edges with opposite recesses and extensions. The curved leading and trailing edges perpendicular to the incident light 411 can reduce the diffracted light into the projection system.

Figure 4:
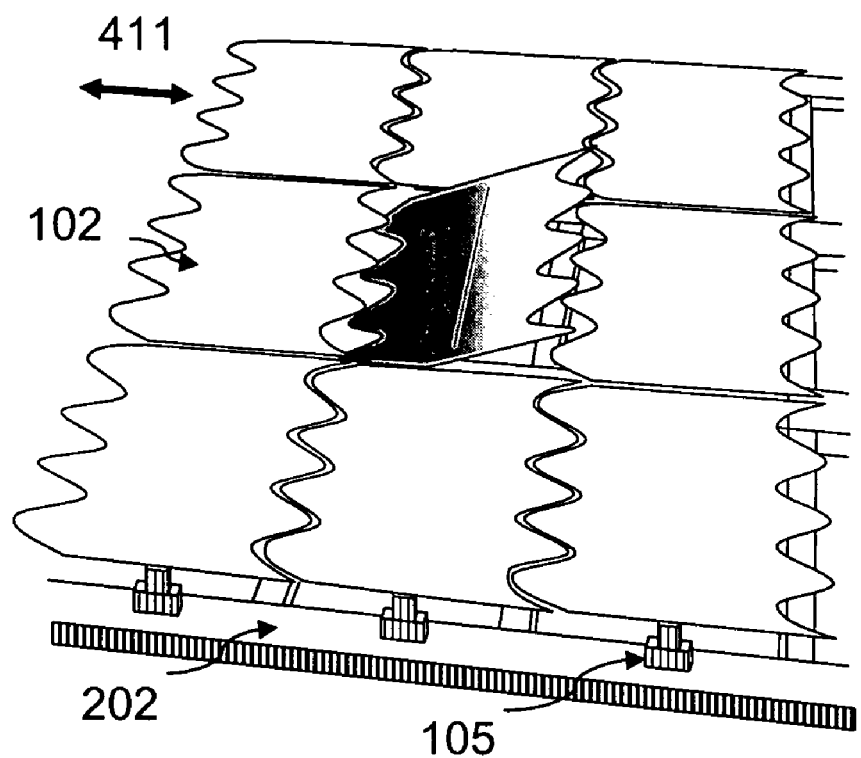
FIG. 4 is a perspective view showing an array of mirror plate having curved edges.

Orthogonal illumination has a higher optical system coupling efficiency, and requires a less expensive, smaller size, and lighter TIR prism. However, since the scattered light from both leading and trailing edges of the mirror plate is scattered straightly into the projection pupil 403, it creates a diffraction pattern, reducing the contrast ratio of a SLM. FIG. 4 shows a perspective view of the top of a part of mirror array with rectangular shape mirrors for the projection system with orthogonal illumination configuration. The hinges 106 are in parallel to the leading and trailing edges of the mirror plate and in perpendicular to the incident light 411, that the mirror pixels in the SLM are illuminated orthogonally. In FIG. 4, each mirror plate in the array has a series of curvatures in the leading edge extension and trailing edge recession. The principle is that a curvature edge weakens the diffraction intensity of scattered light and it further diffracts a large portion of scattered light at a variation of angles away from the optical projection pupil 403. The radius curvature of leading and trailing edges of each mirror plate r may vary depending on the numbers of curvatures selected. As the radius of curvature r becomes smaller, the diffraction reduction effect becomes more prominent. To maximize the diffraction reduction effects, according to another embodiment, a series of small radius curvatures r are designed to form the leading and trailing edges of each mirror plate in the array. The number of curvatures may vary depending on the size of mirror pixels, with a 10 microns size square mirror pixel, two to four curvatures on each leading and trailing edges provides an optimum results an low diffraction and within current manufacturing capability.

Figure 5:
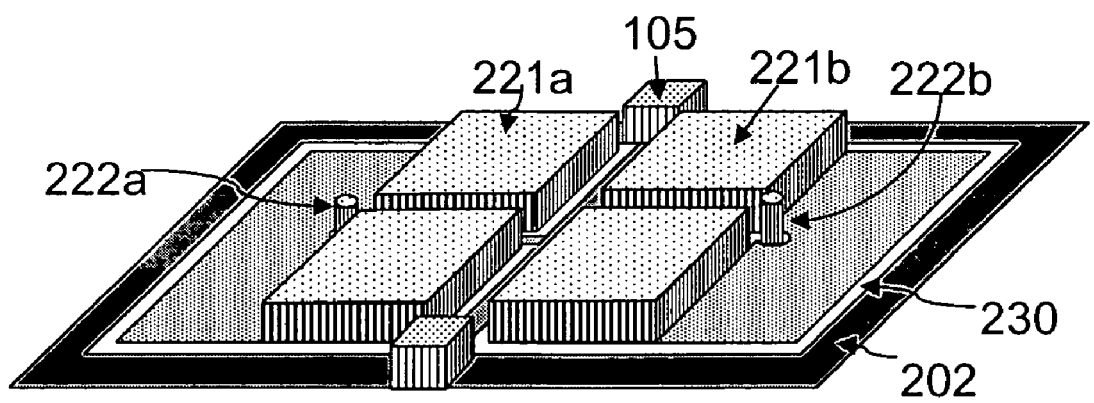
FIG. 5 is a perspective view showing the top of a part of the control circuitry substrate for a mirror plate in FIG. 4.

FIG. 5 is a perspective view showing the top of a part of the control substrate 300 for a projection system with orthogonal illumination configurations. Unlike conventional flat electrodes, the two-level step electrodes 221a and 221b raised above the surface of control substrate 300 near the hinge axis narrows the effective air gap spacing between the flat mirror plate 102 and the lower step of the step electrodes the step electrodes 221a and 221b, which significantly enhancing the electrostatic efficiency of capacitive coupling of mirror plate 102. The number of levels for the step electrodes 221a and 221b can vary from one to ten. However, the larger the number of levels for step electrodes 221a and 22 1b the more complicated and costly it takes to manufacture the devices. A more practical number would be from two to three. FIG. 5 also shows the mechanical landing stops including landing tips 222a and 222b oriented in perpendicular to the surface of control substrate 300. These landing tips 222a and 222b provide a mechanical stop during the landing operation of angular cross over transitions. The landing tips 222a and 222b at the edge of step electrodes 221a and 221b act as landing tips to further overcome the contact surface adhesion. This low voltage driven and high efficiency micro mirror array design allows an operation of a larger total deflection angle ($|\theta|>15°$) of micro mirrors to enhance the brightness and contrast ratio of the SLM.

Figure 6:
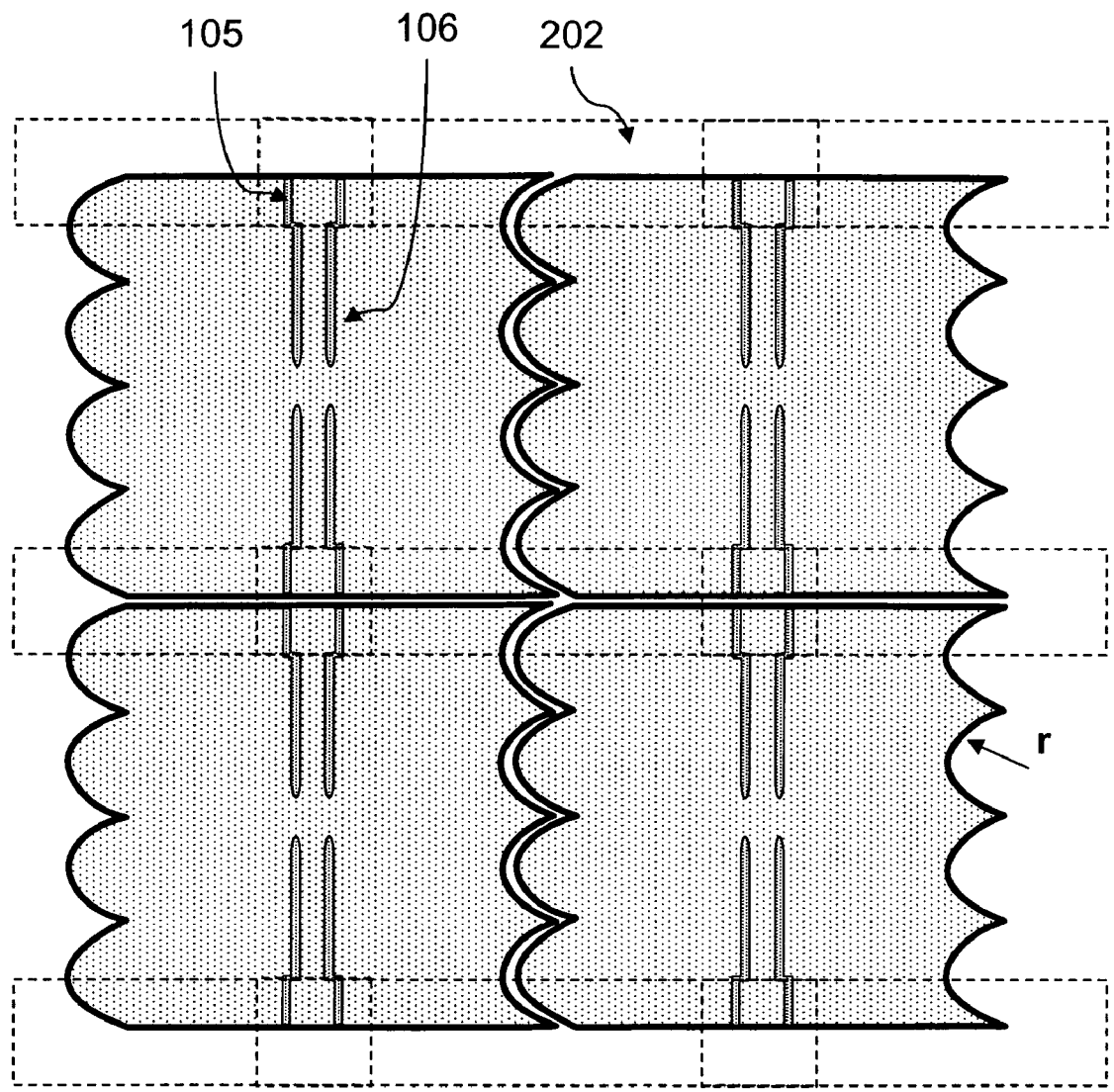
FIG. 6 is an enlarged backside view of the mirror plates having curved leading and trailing edges.

Another advantage of this reflective spatial light modulator is that it produces a high active reflection area fill-ratio by positioning the hinge 106 under the cavities in the lower portion of mirror plate 102, which almost completely eliminates the horizontal displacement of mirror plate 102 during an angular cross over transition. FIG. 6 shows an enlarged backside view of a part of the mirror array designed to reduce diffraction intensity using four-curvature leading and trailing edges for a projection system with orthogonal illumination configuration. Again, pairs of hinges 106 are positioned under two cavities as part of the mirror lower portion 103c and are supported by a pair of hinge support posts 105 on top of hinge support frames 202. A pair of hinge support post 105 has a width W in the cross section much larger than the width of the hinge 106. Since the distance between the axis of between the pair of hinges 106 and the reflective surfaces of the mirror plate is kept minimal, a high active reflection area fill-ratio is achieved by closely packed individual mirror pixels without worrying the horizontal displacement. In one embodiment, mirror pixel size (a×b) is about 10 micron×10 microns, while the radius of curvature r is about 2.5 microns.

Figure 7:
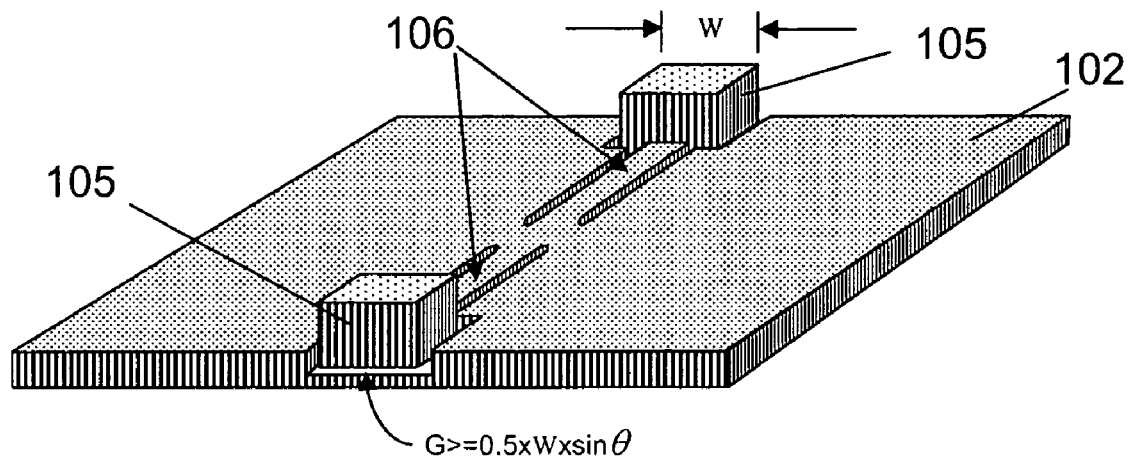
FIG. 7 is a perspective bottom view showing the torsion hinges and their support posts under the cavities in the lower portion of a mirror plate.

FIG. 7 shows an enlarged backside view of a part of the mirror plate showing the hinges 106 and the hinge support posts 105 under the cavities in the lower portion of a mirror plate 102. To achieve optimum performance, it is important to maintain a minimum air gap G in the cavity where the hinges 106 are created. The dimension of the hinges 106 varies depending on the size of the mirror plates 102. In one implementation, the dimension of each hinge 106 is about 0.1×0.2× 3.5 microns, while the hinge support post 105 has a square shaped cross-section with each side W about 1.0 micron width. Since the top surfaces of the hinge support posts 105 are also under the cavities as lower part of the mirror plate 102, the air gap G in the cavity needs to be high enough to accommodate the angular rotation of mirror plate 102 without touching the larger hinge support posts 105 at a predetermined angle $\theta$. In order for the mirror plate to rotate a predetermined angle $\theta$ without touching the hinge support post 105, the air gap of the cavities where hinges 106 are positioned must be larger than $G=0.5 \times W \times SIN(\theta)$, where W is the cross-section width of hinge support posts 105.

Figure 8:
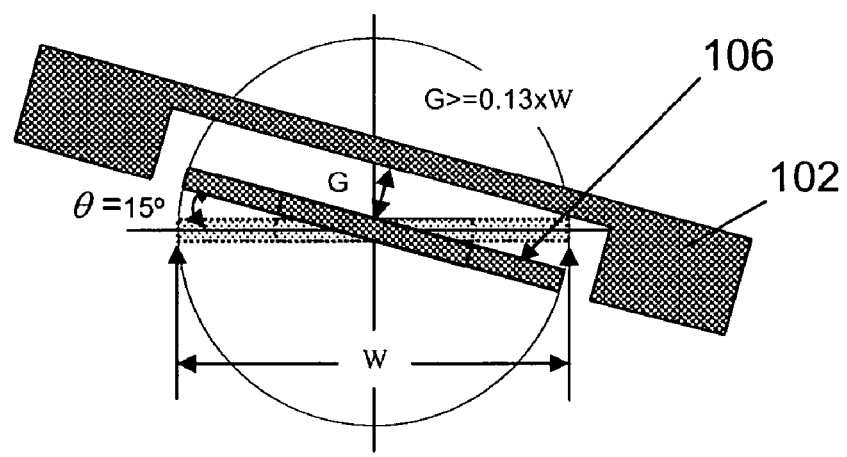
FIG. 8 is a diagram illustrates a minimum air gap spacing around the torsion hinge of a mirror plate when rotated 15° in one direction.

FIG. 8 illustrates a minimum air gap spacing G around the hinge 106 of a mirror plate 102 when rotated 15° in one direction. The calculation indicates the air gap spacing G of hinge 106 in the cavity must be larger than G=0.13 W. If a width of each side W of a square shape hinge support post 105 is 1.0 micron, the air gap spacing G in the cavity should be larger than 0.13 microns. Without horizontal displacement during the angular transition operation, the horizontal gap between the individual mirror plates in the micro mirror array may be reduced to less than 0.2 microns, which leads to a 96% active reflection area fill-ratio of the SLM described herein.

In one implementation, fabrication of a high contrast spatial light modulator is implemented as four sequential processes using standard CMOS technology. A first process forms a control silicon wafer substrate with support frames and arrays of first level electrodes on the substrate surface. The first level electrodes are connected to memory cells in addressing circuitry in the wafer. A second process forms a plurality of second level electrodes, landing tips, and hinge support posts on the surfaces of control substrate. A third process forms a plurality of mirror plates with hidden hinges on each pairs of support posts. Lastly in a fourth process, the fabricated wafer is separated into individual spatial light modulation device dies before finally removing remaining sacrificial materials.

Figure 9:
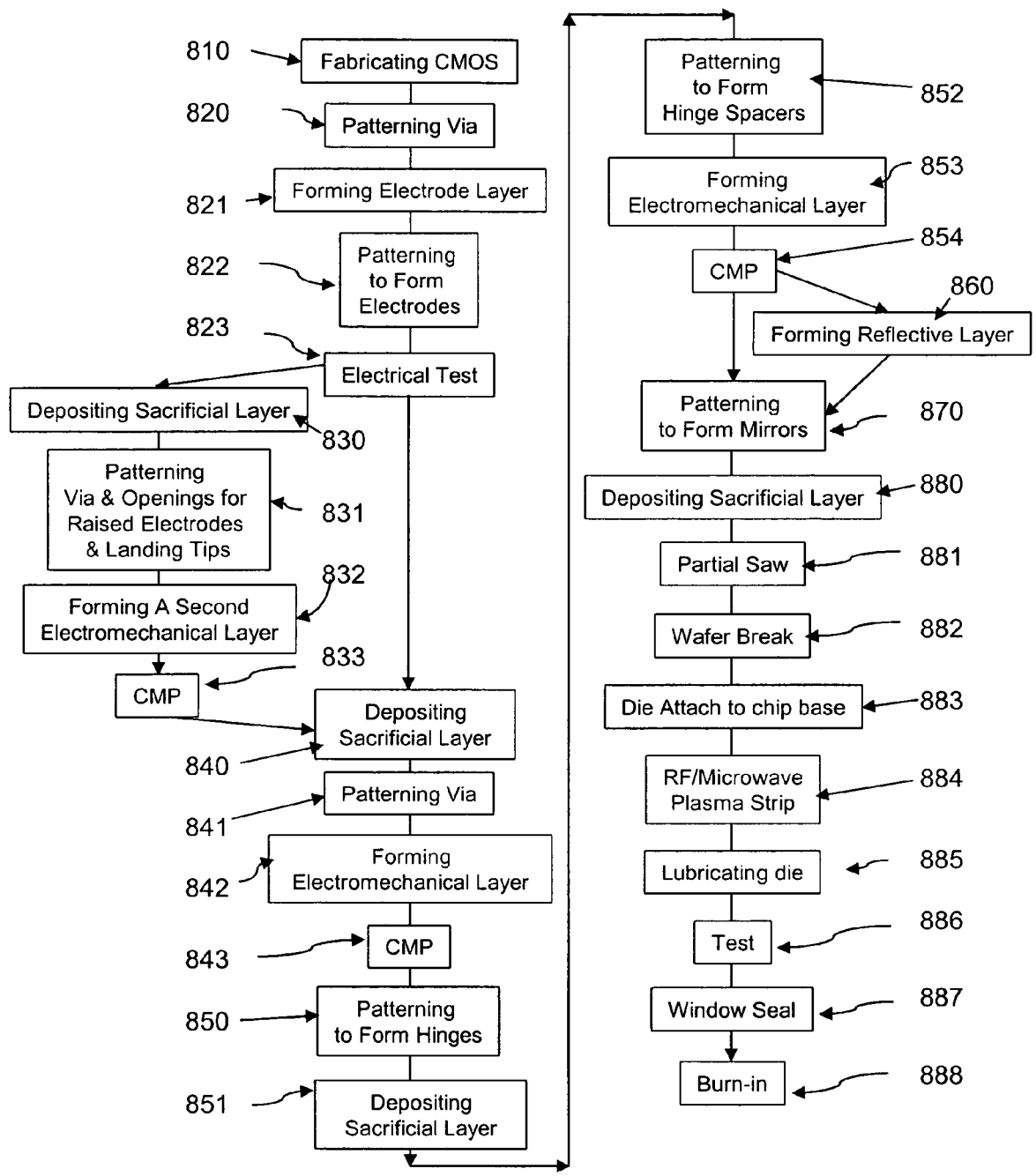
FIG. 9 is a manufacturing process flow diagram for a micro-mirror based spatial light modulator using one or more of the disclosed sacrificial materials.

FIG. 9 is a flow diagram illustrating a process for making a high contrast spatial light modulator. The manufacturing processes starts by fabricating a CMOS circuitry wafer having a plurality of memory cells and word-line/bit-line interconnection structures for communicating signals as the control substrate using common semiconductor technology (step 810).

Figure 10:
FIG. 10-13 are cross-section side views of a part of a spatial light modulator illustrating one method for fabricating a plurality of support frames and the first level electrodes connected to the memory cells in the addressing circuitry.
Figure 11:
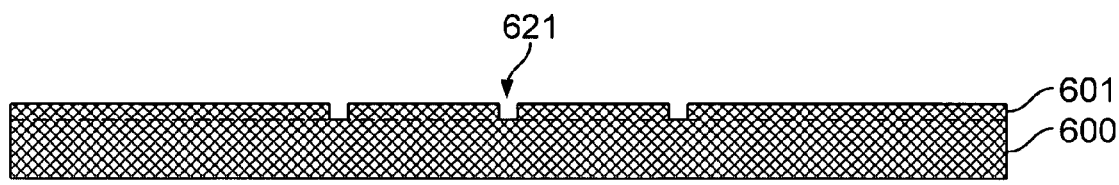

A plurality of first level electrodes and support frames are formed by patterning a plurality of vias through the passivation layer of circuitry opening up the addressing nodes in the control substrate (step 820). To enhance the adhesion for subsequent electromechanical layer, the via and contact openings are exposed to a 2000 watts of RF or microwave plasma with 2 torr total pressures of a mixture of $O_2$, $CF_4$, and $H_2O$ gases at a ratio of 40:1:5 at about 250° C. temperatures for less than five minutes. An electromechanical layer is deposited by physical vapor deposition (PVD) or plasma-enhanced chemical vapor deposition (PECVD) depending on the materials selected filling via and forming an electrode layer on the surface of control substrate (step 821). The deposition of the electromechanical layer and the subsequent formation of the vias are illustrated in FIGS. 10 and 11, and discussed below in relation to FIGS. 10 and 11.

Figure 12:
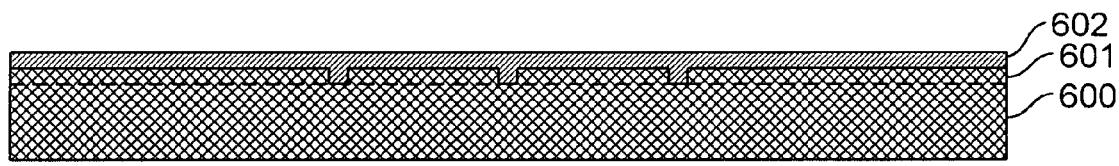
Figure 13:
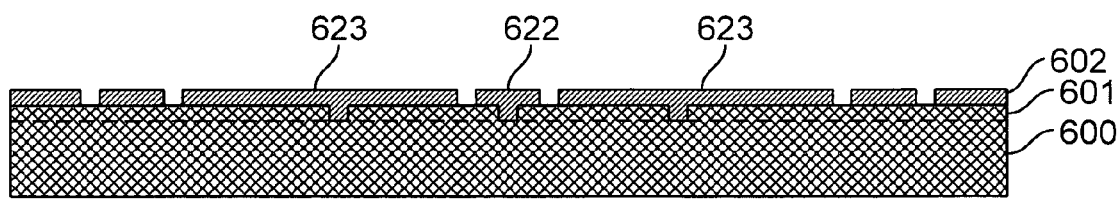
Figure 14:
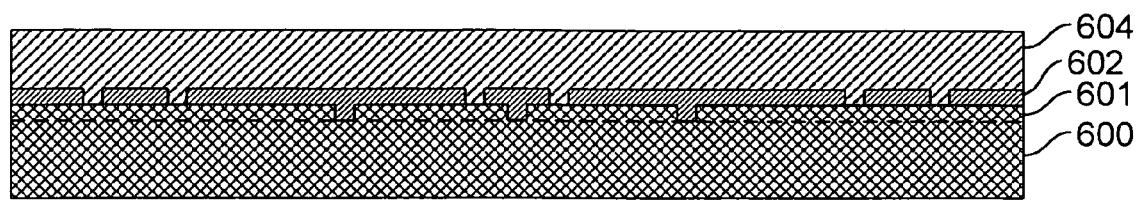
FIG. 14-17 are cross-section side views of a part of a spatial light modulator illustrating one method for fabricating a plurality of support posts, second level electrodes, and landing tips on the surface of control substrate.

Then the electromechanical layer is patterned and anisotropically etched through to form a plurality of electrodes and support frames (step 822). The partially fabricated wafer is tested to ensure the electrical functionality before proceeding to further processes (step 823). The formation of electrodes and support frames are illustrated in FIGS. 12 and 13 and described in detail below in the related discussions.

According to one embodiment, the electromechanical layer deposited and patterned in the steps 821 and 822 can includes a metal including, for example, a pure Al, titanium, tantalum, tungsten, molybdenum film, an Al/poly-Si composite, an Al—Cu alloy, or an Al—Si alloy. While each of these metals has slightly different etching characteristics, they all can be etched in similar chemistry to plasma etching of Al. A two step processes can be carried out to anisotropically etch aluminum metallization layers. First, the wafer is etched in inductively coupled plasma while flowing with $BCl_3$, $Cl_2$, and Ar mixtures at flow rates of 100 sccm, 20 sccm, and 20 sccm respectively. The operating pressure is in the range of 10 to 50 mTorr, the inductive coupled plasma bias power is 300 watts, and the source power is 1000 watts. During the etching process, wafer is cooled with a backside helium gas flow of 20 sccm at a pressure of 1 Torr. Since the Al pattern can not simply be removed from the etching chamber into ambient atmosphere, a second oxygen plasma treatment step must be performed to clean and passivate Al surfaces. In a passivation process, the surfaces of partially fabricated wafer is exposed to a 2000 watts of RF or microwave plasma with 2 torr pressures of a 3000 sccm of $H_2O$ vapor at about 250° C. temperatures for less than three minutes.

According to another embodiment, the electromechanical layer is silicon metallization, which can take the form of a polysilicon, a polycides, or a silicide. While each of these electromechanical layers has slightly different etching characteristics, they all can be etched in similar chemistry to plasma etching of polysilicon. Anisotropic etching of polysilicon can be accomplished with most Cl and F based feedstock, such as $Cl_2$, $BCl_3$, $CF_4$, $NF_3$, $SF_6$, HBr, and their mixtures with Ar, $N_2$, $O_2$, and $H_2$. The poly silicon or silicide layer (WSix, or TiSix, or TaSi) is etched anisotropically in inductively decoupled plasma while flowing $Cl_2$, $BCl_3$, HBr, and $HeO_2$ gases at flow rates of 100 sccm, 50 sccm, 20 sccm, and 10 sccm respectively. In another embodiment, the polycide layer is etched anisotropically in a reactive ion etch chamber flowing $Cl_2$, $SF_6$, HBr, and $HeO_2$ gases at a flow rate of 50 sccm, 40 sccm, 40 sccm, and 10 sccm, respectively. In both cases, the operating pressure is in the range of 10 to 30 mTorr, the inductively coupled plasma bias power is 100 watts, and the source power is 1200 watts. During the etching process, wafer is cooled with a backside helium gas flow of 20 sccm at a pressure of 1 Torr. A typical etch rate can reach 9000 angstroms per minute.

A plurality of second level electrodes can be fabricated on the surface of the control substrate to reduce the distance between the mirror plate and the electrode on the substrate, which improves the electrostatic efficiency. Landing tips can also be fabricated on the substrate to reduce stiction between the mirror plate and the substrate.

A layer of sacrificial material is deposited with a predetermined thickness on the surface of partially fabricated wafer (step 830). In accordance with the present specification, the sacrificial material can include amorphous carbon, polyarylene, polyarylene ether (which can be referred to as SILK), and hydrogen silsesquioxane (HSQ). Amorphous carbon can be deposited by CVD or PECVD. The polyarylene, polyarylene ether, and hydrogen silsesquioxane can be spin-coated on the surface. The sacrificial layer will first be hardened before the subsequent build up, the deposited amorphous carbon can harden by thermal annealing after the deposition by CVD or PECVD process. SILK or HSQ can be hardened by UV exposure and optionally thermal and plasma treatments.

The sacrificial layer is next patterned to form via and contact openings for a plurality of second level electrodes, landing tips, and support posts (step 831). A second electromechanical layer is then deposited by PVD or PECVD depending on the materials selected forming a plurality of second level electrodes, landing tips, and support posts (step 832). Finally, the second electromechanical layer is planarized to a predetermined thickness by CMP (step 833). The height of second level electrodes and landing tips can be less than one micron. Step 830 through step 833 can be repeated to build a number of steps in the step electrodes 221a and 221b. The number of repeated steps 830-833 is determined by the number of steps in the step electrodes 221a and 221b. The steps 830-833 can be bypassed (i.e., from step 823 directly to step 840) when a flat electrode is fabricated on the control substrate.

Once the raised multi-level step electrodes and landing tips are formed on the CMOS control circuitry substrate, a plurality of mirror plates with hidden hinges on each pairs of support posts are fabricated. The processes started with depositing sacrificial materials with a predetermined thickness on the surface of partially fabricated wafer (step 840). Then sacrificial layer is patterned to form via for a plurality of hinge support posts (step 841). The sacrificial layer is further hardened before a deposition of electromechanical materials by PVD or PECVD depending on materials selected to fill the vias and form a thin layer for torsion hinges and part of mirror plates (step 842). The electromechanical layer planarized to a predetermined thickness by CMP (step 843). The electromechanical layer is patterned with a plurality of openings to form a plurality of torsion hinges (step 850). To form a plurality of cavities in the lower portion of mirror plate and torsion hinges positioned under the cavity, sacrificial materials are again deposited to fill the opening gaps around the torsion hinges and to form a thin layer with a predetermined thickness on top of hinges (step 851). The thickness can be slightly larger than $G=0.5\times W\times SIN(\theta)$, where W is the cross-section width of hinge support posts 105. The sacrificial layer patterned to form a plurality of spacers on top of each torsion hinge (step 852). More electromechanical materials are deposited to cover the surface of partially fabricated wafer (step 853).

The sacrificial materials in the steps 840-851 can also be selected from the above disclosed materials including amorphous carbon, polyarylene and polyarylene ether (SILK), and hydrogen silsesquioxane (HSQ). Amorphous carbon can be deposited by CVD or PECVD. Polyarylene, polyarylene ether, and hydrogen silsesquioxane can be spin-coated on the surface. Moreover, different sacrificial materials may be implemented at different steps of the fabrication process.

The electromechanical layer is planarized to a predetermined thickness by CMP (step 854) before a plurality of openings are patterned. The sacrificial materials are removed through the openings to form a plurality of air gaps between individual mirror plates (step 870).

The reflectivity of mirror surface may be enhanced by a PVD deposition of a 400 angstroms or less thick reflective layer selected from the group consisting of aluminum, gold, and combinations thereof (step 860).

The sacrificial materials disclosed in the present specification can be easily removed in dry processes such as isotropic plasma etching, microwave plasma, or activated gas vapor. The sacrificial material can be removed from below other layers of materials. The removal can also be highly selective relative to common semiconductor components. For example, amorphous carbon can be removed at a selectivity ratio of 8:1 relative to silicon and 15:1 relative to silicon oxide. Thus, the disclosed sacrificial materials can be removed with minimal wearing to the intended micro structures.

Another advantage of disclosed sacrificial materials is that they can be removed by isotropic etching in dry processes. The dry removal process is simpler than the wet processes in cleaning the conventional sacrificial materials. Isotropic etching allows convenient removal of the disclosed sacrificial materials that are positioned under an upper structural layer such as a mirror plate, which cannot easily be accomplished by dry anisotropic etching processes.

Another advantage of sacrificial material based on amorphous carbon is that it can be deposited and removed by conventional CMOS processes. Still another advantage of using amorphous carbon as a sacrificial material is that it can maintain high carbon purity and carbon does not usually contaminate to most micro devices.

To separate the fabricated wafer into individual spatial light modulation device dies, a thick layer of sacrificial materials is deposited to cover the fabricated wafer surfaces for protection (step 880). Then the fabricated wafer is partially sawed (step 881) before separating into individual dies by scribing and breaking (step 882). The spatial light modulator device die is attached to the chip base with wire bonds and interconnects (step 883) before a RF or microwave plasma striping of the remaining sacrificial materials (step 884). The SLM device die is further lubricated by exposing to a PECVD coating of lubricants in the interfaces between the mirror plate and the surface of electrodes and landing tips (step 885) before electro-optical functional test (step 886). Finally, the SLM device is hermetically sealed with a glass window lip (step 887) and sent to burn-in process for reliability and robust quality control (step 888).

One problem with the operation of micro mirror array is the stiction of micro mirror at a mechanical landing position. The surface contact adhesion could increases beyond the electrostatic force of control circuitry causing the device from stiction failure in a moisture environment. To reduce the contact adhesion between the mirror plate 102 and landing tips 222a and 222b, and protect the mechanical wear degradation of interfaces during the touch and impact of angular cross over transition, a thin lubricated coating is deposited on the lower portion of mirror plate 102 and on the surfaces of step electrodes 221a and 221b and landing tips 222a and 222b. The lubricants chosen should be thermally stable, low vapor pressure, and non-reactive with metallization and electromechanical materials that formed the micro mirror array devices.

A think layer of fluorocarbon material can be coated to the surfaces of the lower portion of mirror plate and on the surface of electrodes and landing tips. The SLM device die is exposed to plasma of fluorocarbons, such as $CF_4$, at a substrate temperature of about 200° C. temperatures for less than five minutes. The fluorine on the surfaces 103c serves to prevent adherence or attachment of water to the interfaces of mirror plate and the underneath electrodes and landing tips, which eliminates the impact of humidity in the stiction of mirror plate during landing operation. Coating fluorocarbon film in the interfaces between the mirror plate 102 and step electrodes 221a and 221b and landing tips 222a and 222b provides a sufficient repellent performance to water due to the fluorine atoms existing near the exposed surfaces.

In another embodiment, a perfluoropolyether (PFPE) or a mixture of PFPE or a phosphazine derivative is deposited by PECVD in the interfaces between the mirror plate 102 and step electrodes 221a and 221b and landing tips 222a and 222b at a substrate temperature of about 200° C. temperatures for less than five minutes. PFPE molecules have an aggregate vapor pressure in the range of $1 \times 10^{-6}$ to $1 \times 10^{-11}$ atm. The thickness of lubricant film is less than 1000 angstroms. To improve the adhesion and lubricating performance on the surface of a metallization or an electromechanical layer, phosphate esters may be chosen because of its affinity with the metallic surface.

Figure 18:
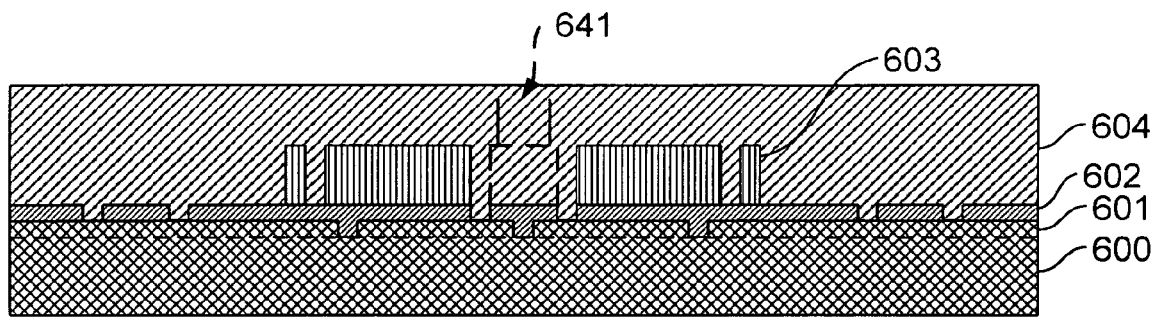
FIG. 18-20 are cross-section side views of a part of a spatial light modulator illustrating one method for fabricating a plurality of torsion hinges and its supports on the support frame.
Figure 19:
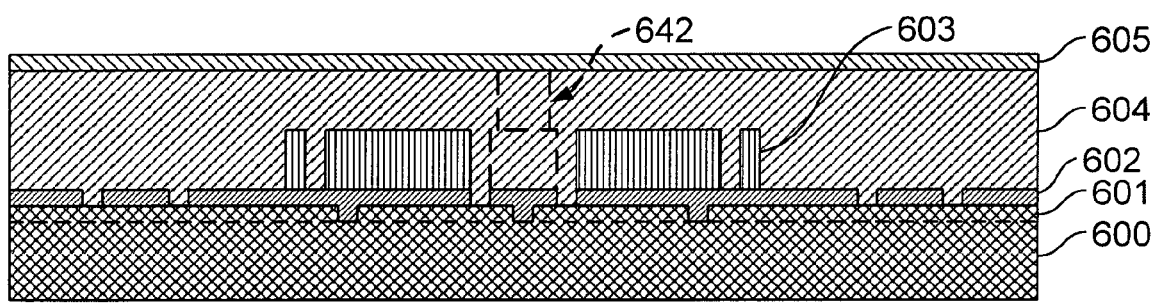
Figure 20:
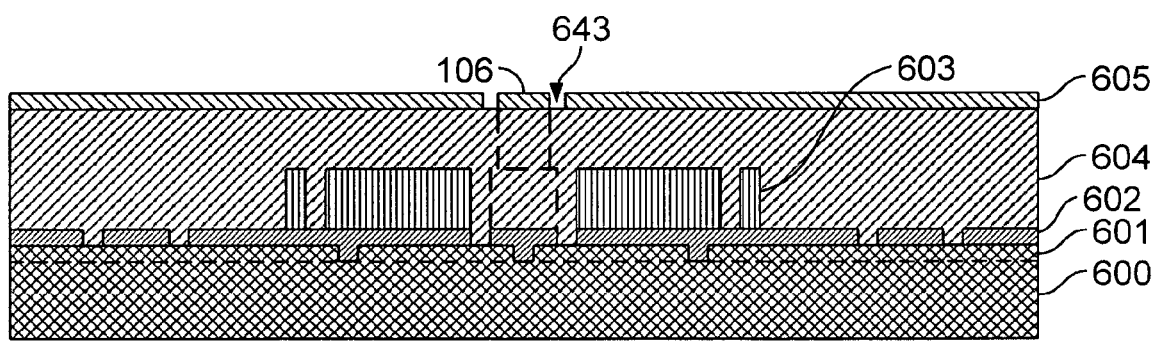
Figure 21:
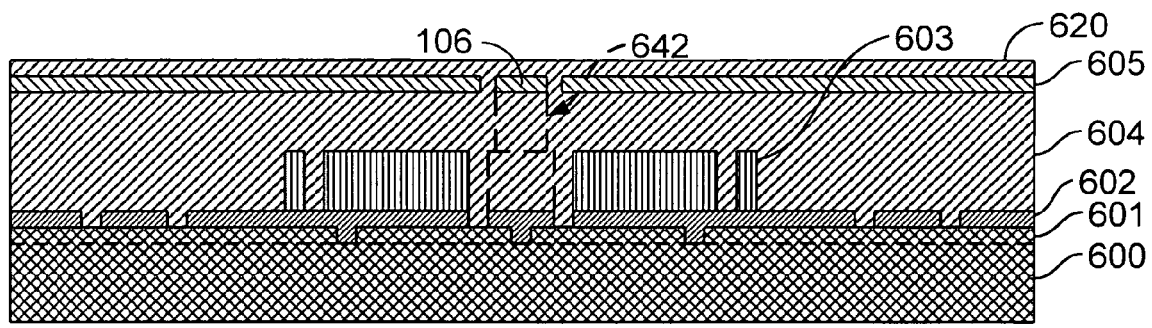
FIG. 21-23 are cross-section side views of a part of a spatial light modulator illustrating one method for fabricating a mirror plate with a plurality of hidden hinges.
Figure 22:
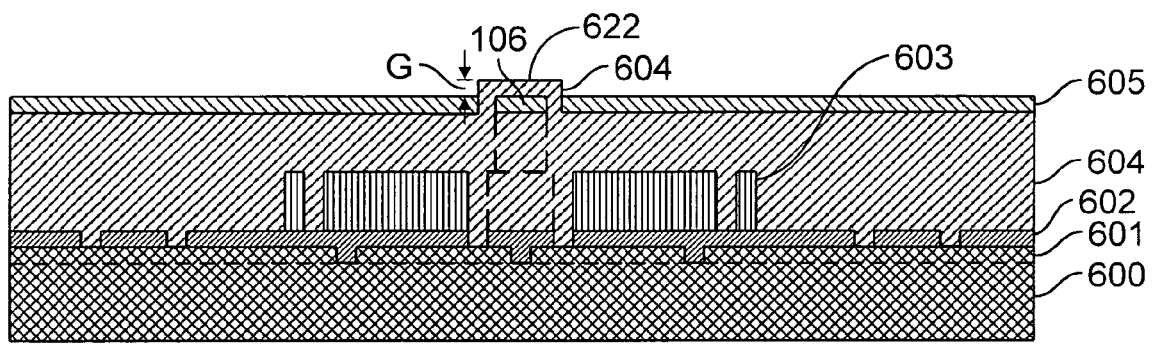
Figure 23:
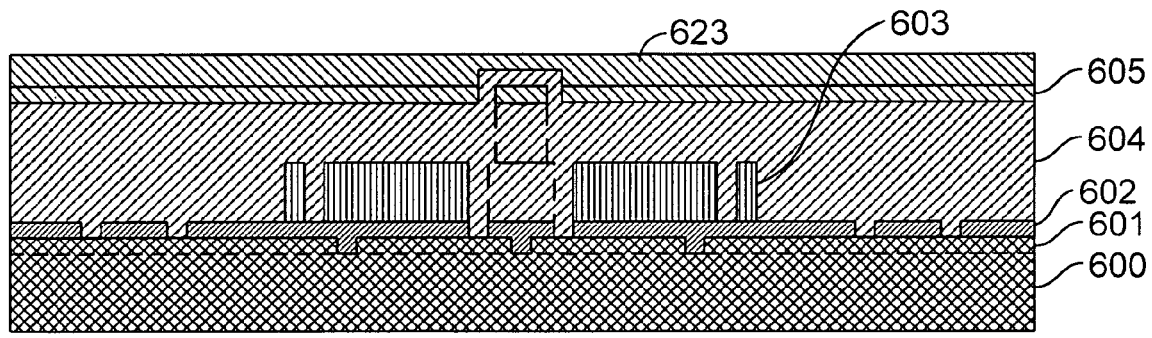

A more detailed description of each process to fabricate a high contrast spatial light modulator is illustrated in a series of cross-section diagrams. FIG. 10 to FIG. 13 are cross-section side views of a part of a spatial light modulator illustrating one method for fabricating a plurality of support frames and the first level electrodes connected to the memory cells in the addressing circuitry. FIG. 14 to FIG. 17 are cross-section side views of a part of a spatial light modulator illustrating one method for fabricating a plurality of support posts, second level electrodes, and landing tips on the surface of control substrate. FIG. 18 to FIG. 20 are cross-section side views of a part of a spatial light modulator illustrating one method for fabricating a plurality of torsion hinges and its supports on the support frame. FIG. 21 to FIG. 23 are cross-section side views of a part of a spatial light modulator illustrating one method for fabricating a mirror plate with a plurality of hidden hinges. FIG. 23 to FIG. 26 are cross-section side views of a part of a spatial light modulator illustrating one method for forming the reflective mirrors and releasing individual mirror plates of a micro mirror array.

FIG. 10 is a cross-section view that illustrates the control silicon wafer substrate 600 after using standard CMOS fabrication technology. In one embodiment, the control circuitry in the control substrate includes an array of memory cells, and word-line/bit-line interconnects for communication signals. There are many different methods to make electrical circuitry that performs the addressing function. The DRAM, SRAM, and latch devices commonly known may all perform the addressing function. Since the mirror plate 102 area may be relatively large on semiconductor scales (for example, the mirror plate 102 may have an area of larger then 100 square microns), complex circuitry can be manufactured beneath micro mirror 102. Possible circuitry includes, but is not limited to, storage buffers to store time sequential pixel information, and circuitry to perform pulse width modulation conversions.

In a typical CMOS fabrication process, the control silicon wafer substrate is covered with a passivation layer 601 such as silicon oxide or silicon nitride. The passivated control substrate 600 is patterned and etched anisotropically to form via 621 connected to the word-line/bit-line interconnects in the addressing circuitry, shown in FIG. 11. According to another embodiment, anisotropic etching of dielectric materials, such as silicon oxides or silicon nitrides, is accomplished with $C_2F_6$ and $CHF_3$ based feedstock and their mixtures with He and $O_2$. An exemplified high selectivity dielectric etching process includes the flow of $C_2F_6$, $CHF_3$, He, and $O_2$ gases at a ratio of 10:10:5:2 mixtures at a total pressure of 100 mTorr with inductive source power of 1200 watts and a bias power 600 watts. The wafers are then cooled with a backside helium gas flow of 20 sccm at a pressure of 2 torr. A typical silicon oxides etch rate can reach 8000 angstroms per minute.

Next, FIG. 12 shows that an electromechanical layer 602 is deposited by PVD or PECVD depending on the electromechanical materials selected. This electromechanical layer 602 is patterned to define regions where the hinge support frames 622 and the first steps of the step electrodes 623 corresponding to each micro mirror plate 102 will be located, as shown in FIG. 13. The patterning of the electromechanical layer 602 can be performed using the following steps. First, a layer of sacrificial material is spin coated to cover the substrate surface. Then the sacrificial layer is exposed to standard photolithography and developed to form predetermined patterns. The electromechanical layer is etched anisotropically through to form a plurality of via and openings. Once via and openings are formed, the partially fabricated wafer is cleaned by removing the residues from the surfaces and inside the openings. This can be accomplished by exposing the patterned wafer to 2000 watts of RF or microwave plasma with 2 torr total pressures of a mixture of $O_2$, $CF_4$, and $H_2O$ gases at a ratio of 40:1:5 at about 250° C. temperatures for less than five minutes. Finally, the surfaces of electromechanical layer is passivated by exposing to a 2000 watts of RF or microwave plasma with 2 torr pressures of a 3000 sccm of $H_2O$ vapor at about 250° C. temperatures for less than three minutes.

A plurality of second steps of the step electrodes 221a and 221b, landing tips 222a and 222b, and hinge support posts 105 are formed on the surface of partially fabricated wafer, through the following steps. A micron thick sacrificial material is deposited or spin-coated on the substrate surface to form a sacrificial layer 604, shown in FIG. 14. A sacrificial layer 604 built by amorphous carbon can harden by thermal annealing after CVD or PECVD. A sacrificial layer 604 based on HSQ or SILK can be hardened by UV exposure and optionally thermal and plasma treatments.

Figure 15:
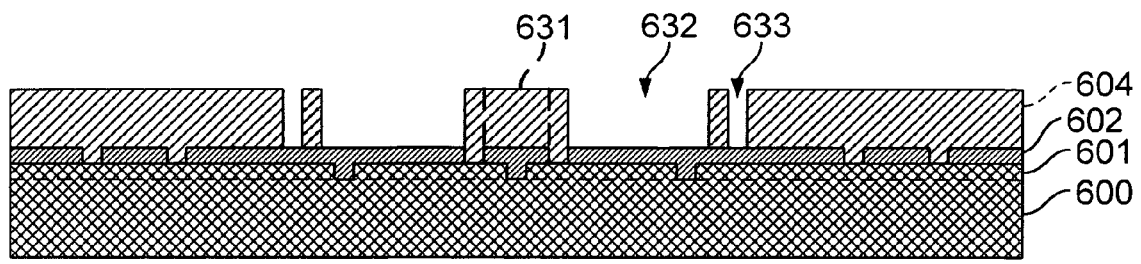
Figure 16:
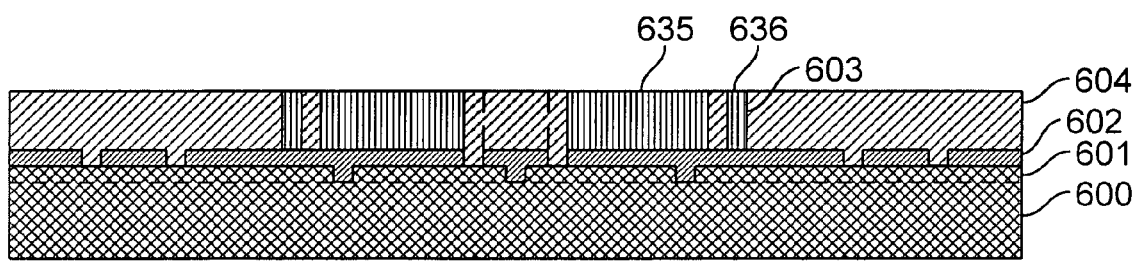

Then, sacrificial layer 604 is patterned to form a plurality of via and contact openings for second level electrodes 632, landing tips 633, and support posts 631 (location of opening for support post 631 shown in phantom) as shown in FIG. 15. To enhance the adhesion for subsequent electromechanical layer, the via and contact openings are exposed to a 2000 watts of RF or microwave plasma with 2 torr total pressures of a mixture of $O_2$, $CF_4$, and $H_2O$ gases at a ratio of 40:1:5 at about 250° C. temperatures for less than five minutes. Electromechanical material 603 is then deposited to fill the via and contact openings. The filling is done by either PECVD or PVD depending on the materials selected. For the materials selected from the group consisting of aluminum, titanium, tungsten, molybdenum, and their alloys, PVD is a common deposition method in the semiconductor industry. For the materials selected from the group consisting of silicon, polysilicon, silicide, polycide, tungsten, and their combinations, PECVD is chosen as a method of deposition. The partially fabricated wafer is further planarized by CMP to a predetermined thickness slightly less than one micron shown in FIG. 16.

Figure 17:
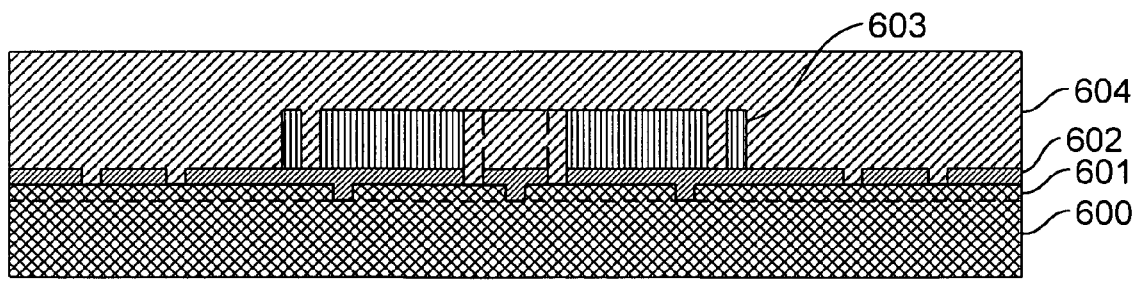

After the CMP planarization, FIG. 17 shows that another layer of sacrificial materials is deposited (in the case of amorphous carbon) or spin-coated (in the case of HSQ or SILK) to a predetermined thickness and hardened to form the air gap spacer under the torsion hinges. The sacrificial layer 604 is patterned to form a plurality of via 641 or contact openings for hinge support posts (shown in phantom), as shown in FIG. 18. In FIG. 19, electromechanical material is deposited to fill the via 641 to form support posts 642 (shown in phantom) and form a torsion hinge layer 605 on the surface. This hinge layer 605 is then planarized by CMP to a predetermined thickness. The thickness of electromechanical layer 605 formed here defines the thickness of torsion hinge bar and the mechanical performance of the mirror plate later on.

The hinge layer 605 can have the thickness in the range of about 400 to 1200 angstroms. The CMP planarization can exert significant mechanical strain on the thin hinge layer 605. A drawback of the conventional sacrificial material based on photo resist is that it may not be able to provide the mechanical strength to support hinge layer 605. In contrast, the sacrificial materials (amorphous carbon, HSQ, or SILK) disclosed in the present specification have higher mechanical strength after hardening comparing to the hardened photo resist. The disclosed sacrificial materials can much better support the hinge layer 605 during the planarization of the hinge layer 605, which allow the hinge layer 605 to stay physically intact and reducing fabrication failure rate.

The hinge layer 605 of the partially fabricated wafer is patterned and anisotropically etched with openings 643 to form a plurality of hinges 106 in the electromechanical layers 605 as shown in FIG. 20. More sacrificial material is deposited to fill the openings 643 surrounding each hinge and to form a thin sacrificial layer 620 with predetermined thickness on the surface, as shown in FIG. 21. The thickness of this layer 620 defines the height of the spacers on top of each hinge 106. The sacrificial layer 620 is then patterned to form a plurality of spacers 622 on top of each hinge 106, as shown in FIG. 22. Since the top surfaces of support posts 642 are also under the cavities as lower part of the mirror plate 102, the air gap G in the cavity needs to be high enough to accommodate the angular rotation of mirror plate 102 without touching the larger hinge support posts 105 at a pre-determined angle θ. In order for the mirror plate to rotate a pre-determined angle θ without touching the hinge support post 105, the air gap of the cavities where the hinges 106 are positioned must be larger than $G=0.5 \times W \times SIN(\theta)$, where W is the cross-section width of hinge support posts 105. Each mirror plate in the array may rotate 15° in each direction. The calculation indicates the air gap spacing G of the hinge 106 in the cavity must be larger than $G=0.13\,W$. If width of each side W of a square shape hinge support post 105 is 1.0 micron, the air gap spacing G in the cavity should be larger than 0.13 microns.

Figure 24:
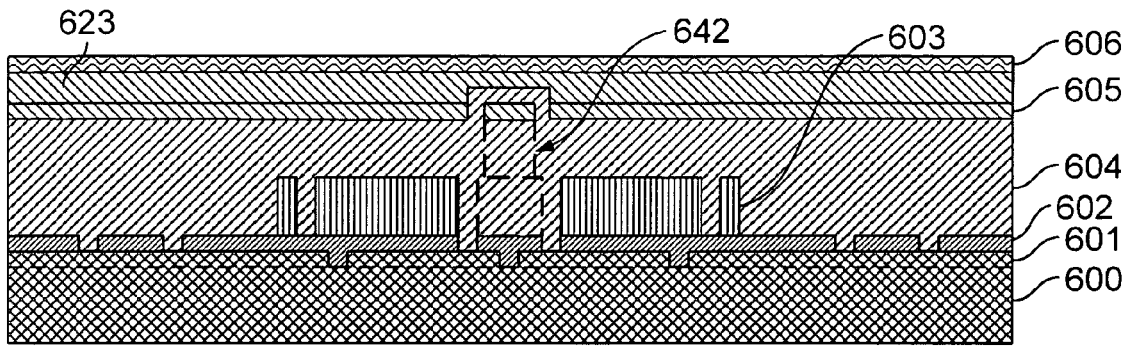
FIG. 24-26 are cross-section side views of a part of a spatial light modulator illustrating one method for forming the reflective mirrors and releasing individual mirror plates of a micro mirror array.
Figure 25:
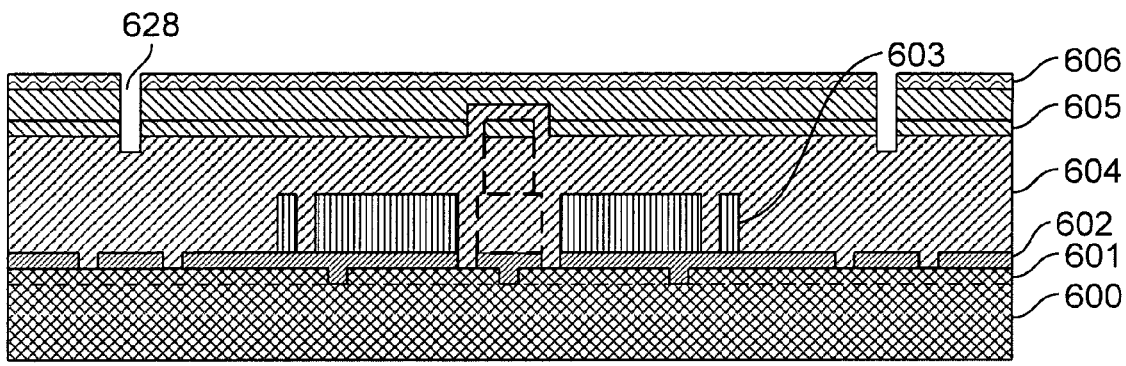

To form a mirror plate with the hinges 106 under each cavities in the lower portion of mirror plate 102, more electromechanical material 623 is deposited to cover a plurality of sacrificial spacers, as shown in FIG. 23. In some cases, a CMP planarization step is added to ensure a flat reflective surface of electromechanical layer 605 has been achieved before etching to form individual mirrors. The total thickness of the electromechanical layer 605, 623 will ultimately be the approximate thickness of the mirror plate 102 eventually fabricated. The surface of partially fabricated wafer can be planarized by CMP to a predetermined thickness of mirror plate 102. The thickness of the mirror plate 102 can be between 0.3 microns to 0.5 microns. If the electromechanical material is aluminum or its metallic alloy, the reflectivity of mirror is high enough for most of display applications. For some other electromechanical materials or for other applications, reflectivity of mirror surface may be enhanced by deposition of a reflective layer 606 of 400 angstroms or less thickness selected from the group consisting of aluminum, gold, their alloys, and combinations, as shown in FIG. 24. The reflective surface 606 of electromechanical layer is then patterned and etched anisotropically through to form recesses 628 which define the boundaries of a plurality of individual mirror plates, as shown in FIG. 25.

Figure 26:
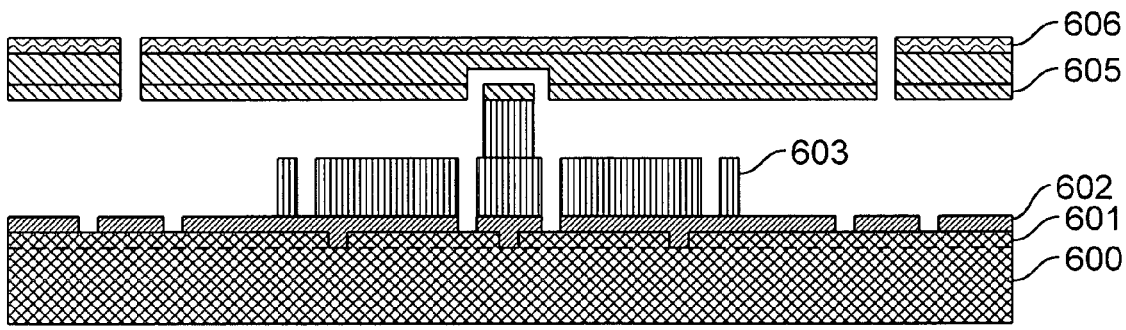

FIG. 26 shows the remaining sacrificial materials 604, 620 are removed and residues are cleaned through a plurality of air gaps between each individual mirror plates in the array to form a functional micro mirror array based spatial light modulator. In a real manufacturing environment, more processes are required before delivering a functional spatial light modulator for video display application. After reflective surface 606 on electromechanical layer 605 is patterned and etched anisotropically through to form a plurality of individual mirror plates, more sacrificial materials are deposited to cover the surface of fabricated wafer. With its surface protected by a layer of sacrificial materials, the fabricated wafer is processed using convention semiconducting processing methods to form individual device dies. In a packaging process, the fabricated wafer is partially sawed (step 881) before being separated into individual dies by scribing and breaking (step 882). The spatial light modulator device die is attached to the chip base with wire bonds and interconnects (step 883) before striping the remaining sacrificial materials and residue in the structures (step 884). Cleaning can be accomplished by exposing the patterned wafer to 2000 watts of RF or microwave plasma with 2 torr total pressures of a mixture of $O_2$, $CF_4$, and $H_2O$ gases at a ratio of 40:1:5 at about 250° C. temperatures for less than five minutes. Finally, the surfaces of electromechanical and metallization structures are passivated by exposing to a 2000 watts of RF or microwave plasma with 2 torr pressures of a 3000 sccm of $H_2O$ vapor at about 250° C. temperatures for less than three minutes.

The SLM device die is further coated with an anti-stiction layer inside the opening structures by exposing to a PECVD of fluorocarbon at about 200° C. temperatures for less than five minutes (step 885) before plasma cleaning and electro-optical functional test (step 886). Finally, the SLM device is hermetically sealed with a glass window lip (step 887) and sent to burn-in process for reliability and robust quality control (step 888).

Figure 27A:
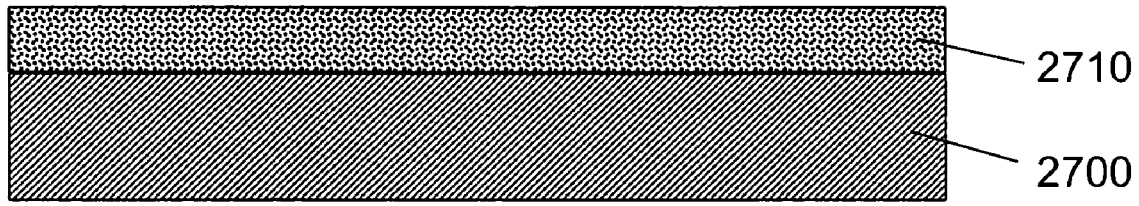
FIGS. 27A-27H are cross-sectional views of forming a cantilever using one or more of the disclosed sacrificial materials.
Figure 27B:
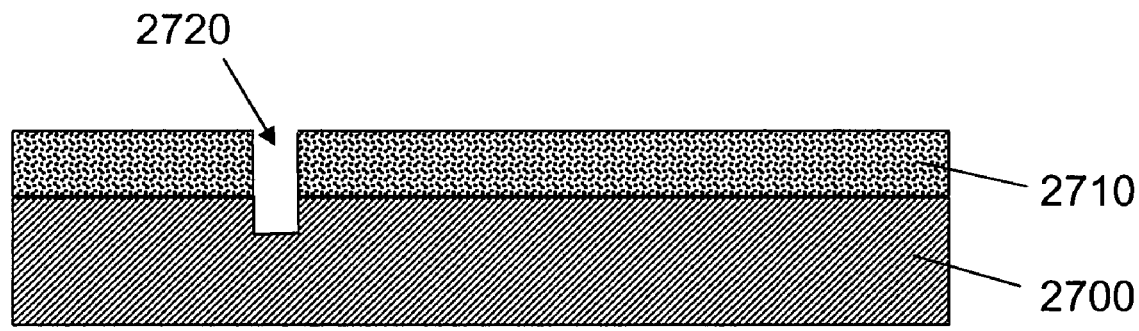
Figure 27C:
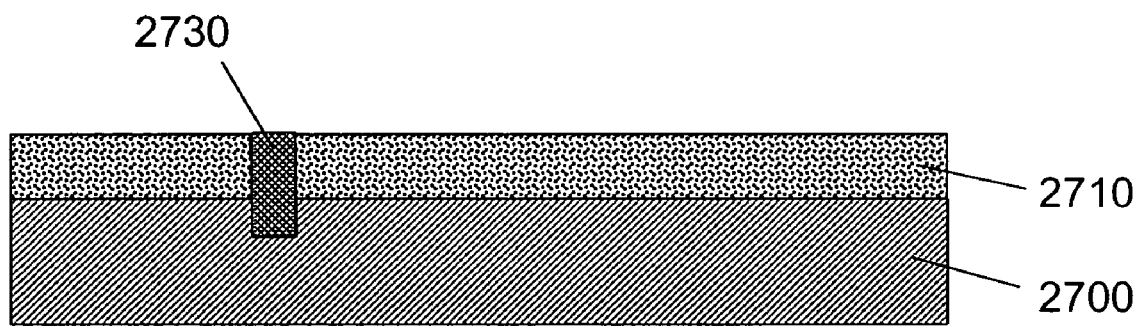

In another example, FIGS. 27A-27H illustrate a manufacturing process for fabricating a cantilever using one or more of the disclosed sacrificial materials. A layer 2710 of a material is first deposited on a substrate 2700, as shown in FIG. 27A. The material in the layer 2710 can include silicon nitride. The substrate 2700 can be made of silicon or complementary metal oxide semiconductor (CMOS). A via hole 2720 is etched through the layer 2710 and into the substrate 2700 as shown in FIG. 27B. The etching can be implemented by a standard semiconductor process: spin-coating a layer of photo resist, forming a patterned photo mask, selectively removing the material in the layer 2710 and the substrate 2700 not covered by the photo mask, and finally removing of the photo mask. The via hole 2720 is then filled with an electrically conductive material 2730, such as tungsten, as shown in FIG. 27C.

Figure 27D:
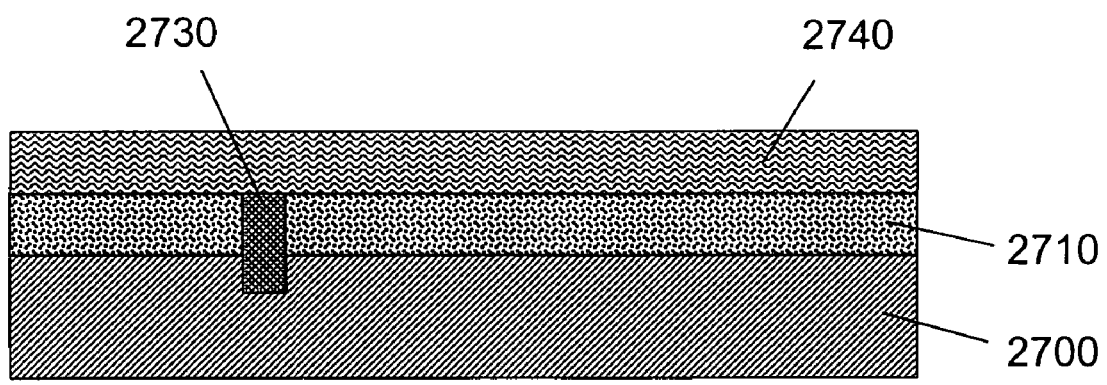

A layer of sacrificial material 2740 is next introduced over the layer 2710 and the electrically conductive material 2730, as shown in FIG. 27D. The sacrificial material 2730 can include amorphous carbon, polyarylene, polyarylene ether (which can be referred to as SILK), and hydrogen silsesquioxane (HSQ). As described previously, the amorphous carbon can be deposited by CVD or PECVD. The polyarylene, polyarylene ether, and hydrogen silsesquioxane can be spin-coated on the surface. The deposited amorphous carbon can be hardened by thermal annealing. SILK or HSQ can be hardened by UV exposure and optionally thermal and plasma treatments.

Figure 27E:
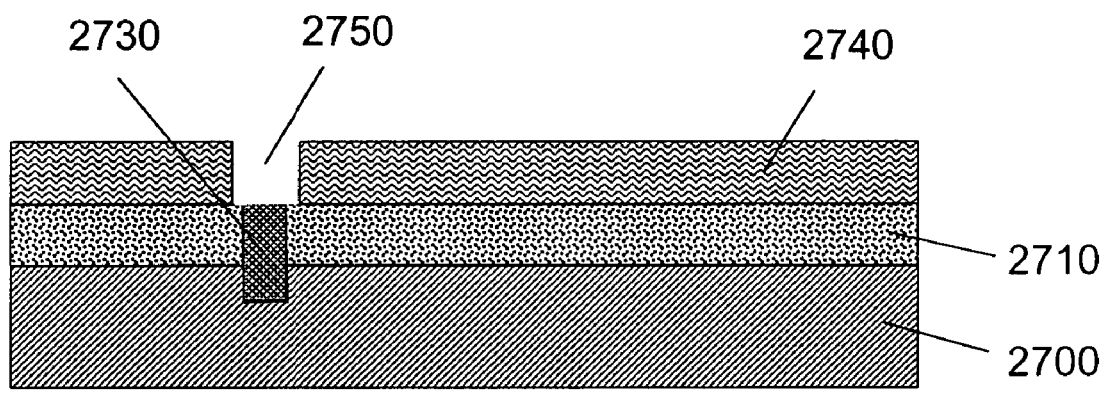
Figure 27F:
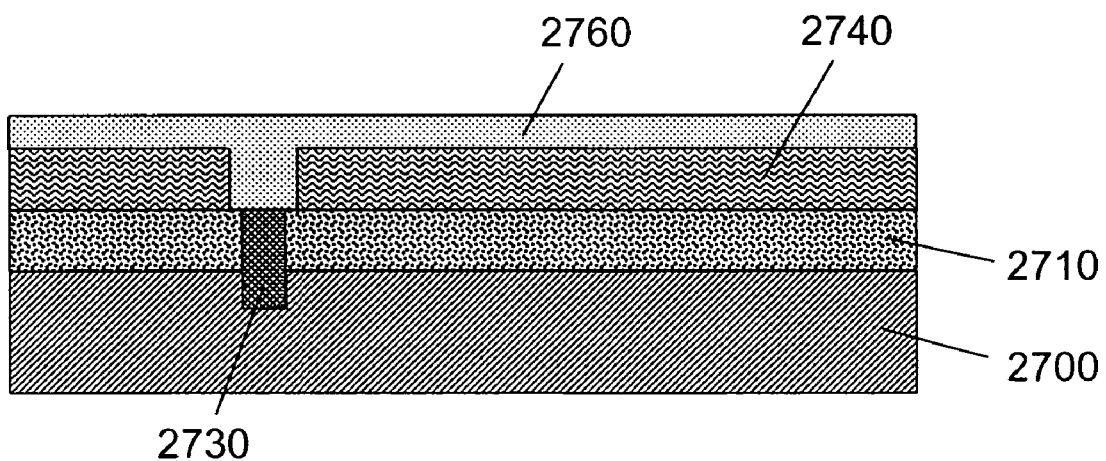

A recess hole 2750 is next etched in the layer of sacrificial material 2740 using standard semiconductor etching processing to expose the upper surface of the electric conductive material 2730, as shown in FIG. 27E. A cantilever material is then deposited to fill the recess hole 2750 and to form a cantilever layer 2760 over the layer of sacrificial material 2740, as shown in FIG. 27F. The cantilever material can be an electrically conductive material, such as titanium.

Figure 27G:
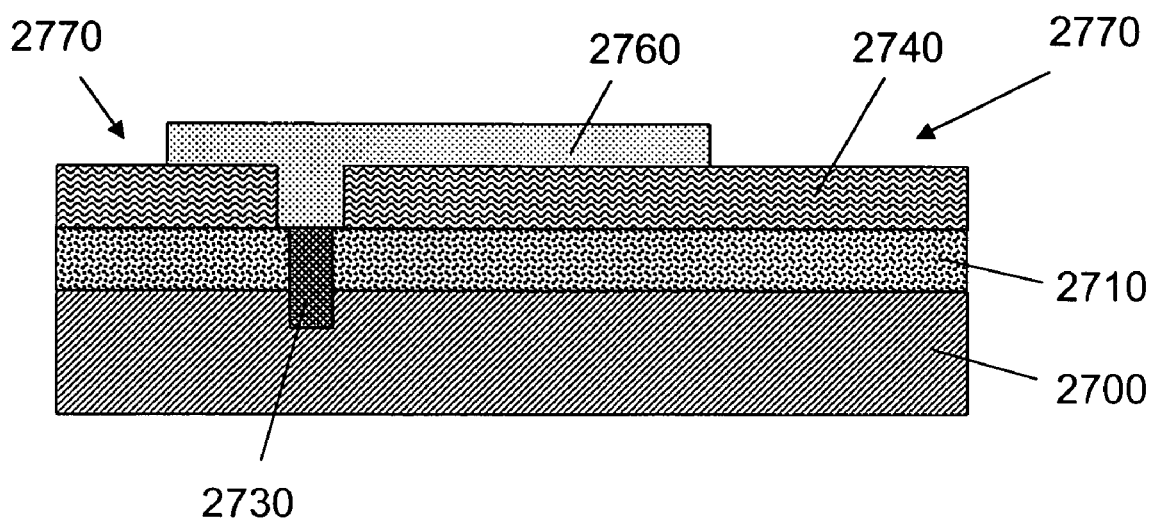
Figure 27H:
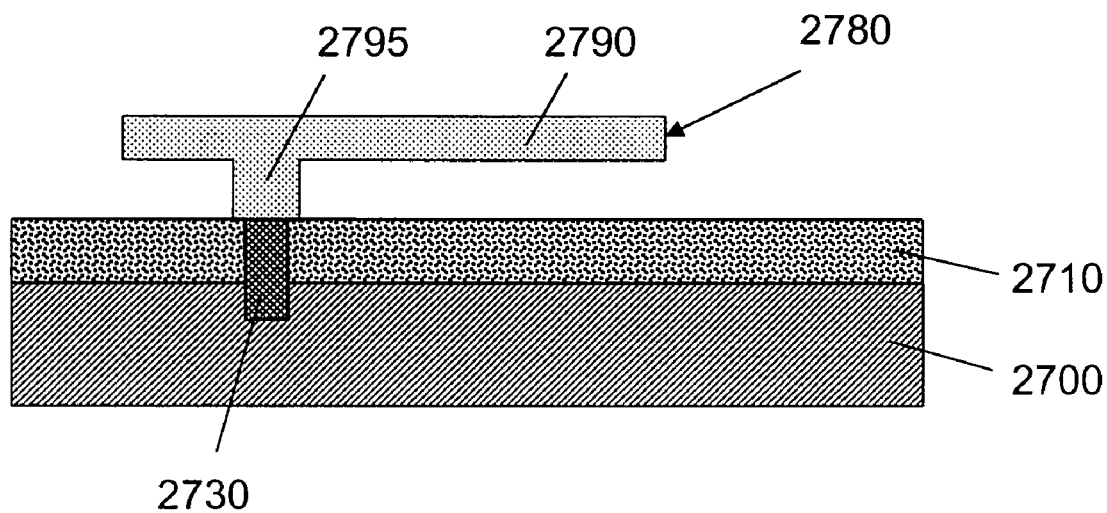

The cantilever material in the cantilever layer 2760 is then etched in areas 2770 to expose the upper surface of the layer of sacrificial material 2740, as shown in FIG. 27G. The sacrificial material 2740 is removed using a dry process, such as isotropic plasma etching, microwave plasma, or activated gas vapor, to form a cantilever 2780, as shown in FIG. 27H.

The cantilever 2780 includes a cantilever layer 2790 and a cantilever support post 2795. The substrate 2700 can include a control circuit that can control the electric potential of the cantilever plate 2790 through the electric conductive material 2730 and the cantilever post 2795. In one embodiment, an electric potential difference can be produced between the cantilever plate 2790 and an electrode (not shown) over the layer 2710. The cantilever plate 2790 can be actuated to move by the electrostatic force caused by the electric potential difference.

Although multiple embodiments have been shown and described, it will be understood by persons skilled in the relevant art that various changes in form and details can be made therein without departing from the spirit and scope. The disclosed sacrificial materials can be applied to many other types of micro devices in addition to the examples described above. For example, the disclosed sacrificial materials and the methods can be used to form micro mechanical devices, micro electrical mechanical devices (MEMS), microfluidic devices, micro sensors, micro actuators, micro display devices, printing devices, and optical waveguide. The disclosed sacrificial materials and the methods are generally suitable for the fabrication of micro devices comprising cavities, recesses, micro bridges, micro tunnels, or overhanging micro structures, such as cantilevers. The disclosed sacrificial materials and methods can be advantageously applied to fabricate such micro devices over substrates that contain electronic circuits. Furthermore, the disclosed sacrificial materials and methods are particularly suitable to fabricate micro devices over substrates containing electronic circuit wherein high processing is required.

What is claimed is:

1. A method of fabricating a tiltable micro mirror plate, comprising:
    forming a substrate comprising an upper surface and a hinge support post in connection with the upper surface;
    depositing a first solid sacrificial material over the substrate, wherein the first solid sacrificial material is selected from the group of amorphous carbon, polyarylene, polyarylene ether, and hydrogen silsesquioxane;
    planarizing the first sacrificial material by chemical mechanical polishing the sacrificial material to the same height as a top surface of the hinge support post;
    after planarizing the first sacrificial material, depositing one or more layers of structural materials over the first sacrificial material and over the top surface of the hinge support post;
    forming an opening in the one or more layers of structural materials, wherein the opening can provide access from outside to the first sacrificial material below the one or more layers of structural materials; and
    removing the first sacrificial material to form the tiltable micro mirror plate in connection with the hinge support post.

2. The method of claim 1, wherein the sacrificial material comprises amorphous carbon and the disposing of the first sacrificial material over the substrate comprises depositing the amorphous carbon over the substrate by CVD or PECVD.

3. The method of claim 1, further comprising:
    removing the first sacrificial material by plasma etching through the opening in the one or more layers of structural materials.

4. The method of claim 1, wherein the substrate further comprises a landing tip in connection with the upper surface, and wherein the landing tip is configured to stop the tilt movement of the tiltable micro mirror plate by coming into contact with the lower surface of the tiltable micro mirror plate.

5. The method of claim 1, wherein the substrate comprises an electronic circuit configured to control the tilt movement of the tiltable micro mirror plate.

6. The method of claim 1, wherein the structural material comprises a material selected from the group of titanium, tantalum, tungsten, molybdenum, an alloy, aluminum, aluminum-silicon alloys, silicon, amorphous silicon, polysilicon, and silicide.

7. A method of fabricating a tiltable micro mirror plate, comprising:
    forming a substrate comprising an upper surface and a hinge support post in connection with the upper surface;
    disposing a first sacrificial material over the substrate, wherein the first sacrificial material is selected from the group of amorphous carbon, polyarylene, polyarylene ether, and hydrogen silsesciuioxane;
    planarizing the first sacrificial material to the same height as a top surface of the hinge support post;
    after planarizing the first sacrificial material, depositing one or more layers of structural materials over the first sacrificial material and over the top surface of the hinge support post;
    forming an opening in the one or more layers of structural materials, wherein the opening can provide access from outside to the first sacrificial material below the one or more layers of structural materials; and
    removing the first sacrificial material to form the tiltable micro mirror plate in connection with the hinge support post;
    forming a mask over the one more layers of structural materials; and
    selectively removing the one or more layers of structural not covered by the mask to form the opening in the one or more layer of structural materials.

8. A method of fabricating a tiltable micro mirror plate, comprising:
    forming a substrate comprising an upper surface and a hinge support post in connection with the upper surface;
    disposing a first sacrificial material over the substrate, wherein the first sacrificial material is selected from the group of amorphous carbon, polyarylene, polyarylene ether, and hydrogen silsesciuioxane;

planarizing the first sacrificial material to the same height as a top surface of the hinge support post;

after planarizing the first sacrificial material, depositing one or more layers of structural materials over the first sacrificial material and over the top surface of the hinge support post, wherein depositing the one or more layers of structural materials over the first sacrificial material comprises:

depositing a conductive material to form a lower layer for the tiltable micro mirror plate;

depositing a structural material over the lower layer to form a middle layer for the tiltable micro mirror plate; and depositing a reflective material over the middle layer to form an upper layer for the tiltable micro mirror plate;

forming an opening in the one or more layers of structural materials, wherein the opening can provide access from outside to the first sacrificial material below the one or more layers of structural materials; and removing the first sacrificial material to form the tiltable micro mirror plate in connection with the hinge support post.

9. The method of claim 8, wherein the substrate comprises an electrode over the upper surface of the substrate, and wherein the tiltable micro mirror plate is actuatable to tilt when an electric voltage is applied between the conductive material in the lower layer of the mirror plate and the electrode over the upper surface of the substrate.

10. A method of fabricating a tiltable micro mirror plate, comprising:

forming a substrate comprising an upper surface and a hinge support post in connection with the upper surface;

disposing a first sacrificial material over the substrate, wherein the first sacrificial material is selected from the group consisting of amorphous carbon, polyarylene, polyarylene ether, and hydrogen silsesquioxane;

depositing one or more layers of structural materials over the first sacrificial material, wherein depositing includes:

depositing a conductive material to form a lower layer of a tiltable micro mirror plate;

depositing a structural material over the lower layer to form a middle layer of the tiltable micro mirror plate; and depositing a reflective material over the middle layer to form an upper layer of the tiltable micro mirror plate;

forming a cavity in the lower layer of the tiltable micro mirror plate;

filling the cavity with a second sacrificial material selected from the group of amorphous carbon, polyarylene, polyarylene ether, and hydrogen silsesquioxane prior to depositing the structural material to form the middle layer for the tiltable micro mirror plate;

forming an opening in the one or more layers of structural materials, wherein the opening can provide access from outside to the first sacrificial material below the one or more layers of structural materials; and removing the first sacrificial material to form the tiltable micro mirror plate in connection with the hinge support post.

11. The method of claim 10, wherein:

removing the first sacrificial material includes removing the second sacrificial material to form the tiltable micro mirror plate having an opening in the lower surface of the lower layer and a hinge component in connection with the hinge support post, wherein the hinge component extends into the cavity in the lower layer, and wherein the tiltable mirror plate is configured to tilt about a pivot point defined by the hinge component.

* * * * *

UNITED STATES PATENT AND TRADEMARK OFFICE
CERTIFICATE OF CORRECTION

PATENT NO. : 7,471,440 B2  Page 1 of 1
APPLICATION NO. : 11/407014
DATED : December 30, 2008
INVENTOR(S) : Shaoher X. Pan It is certified that error appears in the above-identified patent and that said Letters Patent is hereby corrected as shown below:

Column 18, Line 41 at Claim 7; replace:
"ether, and hydrogen silsesciuioxane;" with
-- ether, and hydrogen silsesquioxane; and --

Column 18, Line 51 at Claim 7; replace:
"more layers of structural materials; and" with
-- more layers of structural materials; --

Column 18, Line 55 at Claim 7; replace:
"forming a mask over the one more layers of structural" with
-- forming a mask over the one or more layers of structural --

Column 18, Line 57 at Claim 7; replace:
"selectively removing the one or more layers of structural" with
-- selectively removing the one or more layers of structural materials --

Column 18, Line 59 at Claim 7; replace:
"or more layer of structural materials." with
-- or more layers of structural materials. --

Column 18, Line 67 at Claim 8; replace:
"ether, and hydrogen silsesciuioxane;" with
-- ether, and hydrogen silsesquioxane; --

Signed and Sealed this

Third Day of March, 2009

JOHN DOLL
*Acting Director of the United States Patent and Trademark Office*